US012174972B2

United States Patent
Caspi et al.

(10) Patent No.: US 12,174,972 B2
(45) Date of Patent: *Dec. 24, 2024

(54) SECURE ENCRYPTION KEY MANAGEMENT IN TRUST DOMAINS

(71) Applicant: Intel Corporation, Santa Clara, CA (US)

(72) Inventors: Dror Caspi, Kiryat Yam (IL); Arie Aharon, Haifa (IL); Gideon Gerzon, Zichron Yaakov (IL); Hormuzd Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/464,163

(22) Filed: Sep. 1, 2021

(65) Prior Publication Data
US 2021/0397721 A1 Dec. 23, 2021

Related U.S. Application Data

(63) Continuation of application No. 16/228,206, filed on Dec. 20, 2018, now Pat. No. 11,138,320.

(51) Int. Cl.
*G06F 21/00* (2013.01)
*G06F 21/60* (2013.01)
(Continued)

(52) U.S. Cl.
CPC .......... *G06F 21/602* (2013.01); *H04L 9/0863* (2013.01); *H04L 9/14* (2013.01)

(58) Field of Classification Search
CPC ........ G06F 21/602; H04L 9/0863; H04L 9/14
(Continued)

(56) References Cited

U.S. PATENT DOCUMENTS 6,754,820 B1 * 6/2004 Scheidt ................. H04L 63/105
713/184
2017/0093565 A1 * 3/2017 Yang ..................... H04W 12/06
(Continued)

OTHER PUBLICATIONS

European Search Report and Search Opinion, EP App. No. 19203719, Feb. 10, 2020, 8 pages.
(Continued)

*Primary Examiner* — Jeffrey C Pwu
*Assistant Examiner* — Samuel Ambaye
(74) *Attorney, Agent, or Firm* — NICHOLSON DE VOS WEBSTER & ELLIOTT LLP

(57) ABSTRACT

Implementations describe providing secure encryption key management in trust domains. In one implementation, a processing device includes a key ownership table (KOT) that is protected against software access. The processing device further includes a processing core to execute a trust domain resource manager (TDRM) to create a trust domain (TD) and a randomly-generated encryption key corresponding to the TD, the randomly-generated encryption key identified by a guest key identifier (GKID) and protected against software access from at least one of the TDRM or other TDs, the TDRM is to reference the KOT to obtain at least one unassigned host key identifier (HKID) utilized to encrypt a TD memory, the TDRM is to assign the HKID to the TD by marking the HKID in the KOT as assigned, and configure the randomly-generated encryption key on the processing device by associating the randomly-generated encryption key with the HKID.

19 Claims, 15 Drawing Sheets

(51) Int. Cl.
*H04L 9/08* (2006.01)
*H04L 9/14* (2006.01)

(58) Field of Classification Search
USPC .......................................................... 713/183
See application file for complete search history.

(56) References Cited

U.S. PATENT DOCUMENTS

| | | | |
|---|---|---|---|
| 2017/0132158 A1* | 5/2017 | Axnix | ...................... H04L 9/14 |
| 2017/0244557 A1* | 8/2017 | Riel | ....................... H04L 9/088 |
| 2018/0095898 A1* | 4/2018 | Khosravi | ............... G06F 21/445 |
| 2018/0247082 A1* | 8/2018 | Durham | ................... G06F 8/63 |
| 2019/0087575 A1* | 3/2019 | Sahita | .................... G06F 21/71 |

OTHER PUBLICATIONS

Notice of Allowance, U.S. Appl. No. 16/228,206, filed Jun. 1, 2021, 11 pages.
Intention to Grant, EP App. No. 19203719, Jan. 11, 2023, 08 pages.

* cited by examiner

600B

Responsive to reclaiming the HKID from the TD, the TDRM is to revive the TD, the TDRM is executed by the processing device.
660

Assign an unassigned HKID from the KOT to the TD.
665

Configure the randomly-generated encryption key on the processing device by associating the randomly-generated encryption key with the HKID, wherein the assigned HKID and the configured randomly-generated encryption key allow the TD memory to be accessible by the TD.
670

Reference the KOT to mark the HKID as assigned
690

FIG. 6B

SECURE ENCRYPTION KEY MANAGEMENT IN TRUST DOMAINS

The disclosure pertains to computer systems; more specifically, to secure encryption key management in trust domains.

BACKGROUND

Modern processors are designed to protect sensitive data in memory, as well as at rest, from both hardware and software attacks. Some processors provide cryptographic mechanisms for encrypting data and code in memory to protect the confidentiality of this data. This data in memory could include sensitive data such as privacy-sensitive data, IP-sensitive data, as well as encryption keys used for data or communication encryption. However, allowing software applications to manage encryption keys may expose the encryption mechanism to vulnerabilities within the software applications. There may be instances, particularly in virtualization environments, where software applications running on a host system may inadvertently cause an undesirable result if permitted to directly manage encryption keys that are meant to be exclusively handled by isolated guest systems.

BRIEF DESCRIPTION OF THE DRAWINGS

FIG. 6B is a flow diagram of an example method for reviving a TD with an assigned host key identifier according to one implementation.

DETAILED DESCRIPTION

Figure 1:
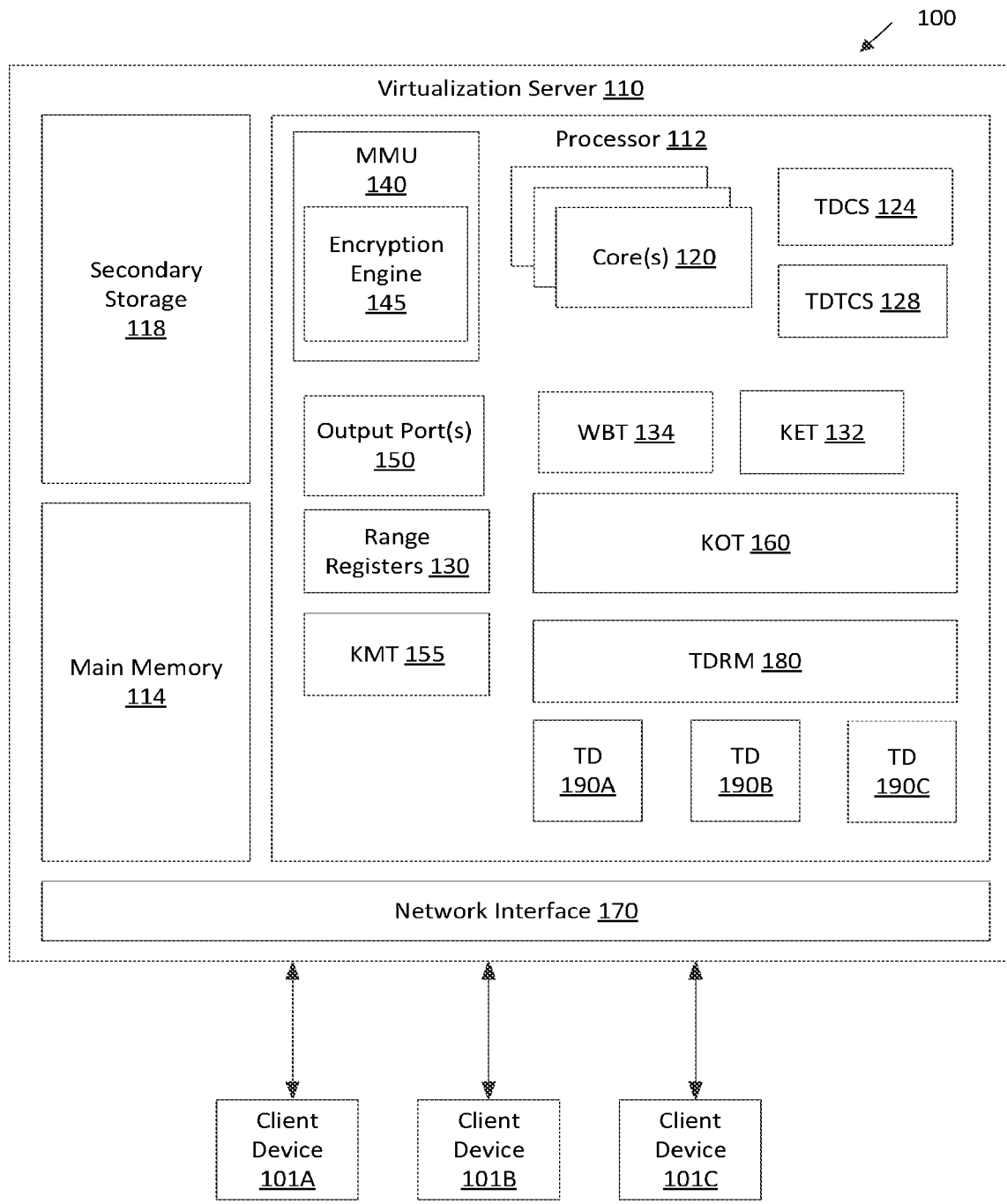
FIG. 1 is a block diagram illustrating an example computing system that provides secure encryption key management in trust domains in a computer system according to one implementation.

An architecture to provide secure encryption key management in trust domains (TDs) is described. A TD architecture and instruction set architecture (ISA) extensions (referred to herein as TD extensions (TDX)) provides confidentiality (and integrity) for customer (tenant) software executing in an untrusted cloud service provider (CSP) infrastructure. The TDX architecture, which can be a System-on-Chip (SoC) capability, provides isolation between TD workloads and CSP software, such as a virtual machine manager (VMM) of the CSP. Components of the TDX architecture may include 1) memory encryption engine, 2) a resource management capability referred to herein as the trust domain resource manager (TDRM) (e.g., a TDRM may be a software extension of the Virtual Machine Monitor (VMM)), and 3) secure encryption key management capabilities provided via a set of micro-architectural tables, a set of instructions, and central processing unit (CPU) access-controlled TD control structures. The TDX architecture provides an ability of the processor to deploy TDs that leverage the memory encryption engine, the secure key management operations, and the access-controlled TD control structures for secure operation of TD workloads.

In one implementation, the tenant's software is executed in an architectural concept known as a TD. A TD (also referred to as a tenant TD) refers to a tenant workload (which can comprise an operating system (OS) alone along with other ring-3 applications running on top of the OS, or a virtual machine (VM) running on top of a VMM along with other ring-3 applications, for example). Each TD operates independently of other TDs in the system and uses logical processor(s), memory, and I/O assigned by the TDRM on the platform. Each TD is cryptographically-isolated in memory using at least one exclusive encryption key of the memory encryption engine for encrypting the memory (storing code and/or data) associated with the trust domain. An encryption key is identified at the CPU level as host key identifier (HKID).

In implementations of the disclosure, the TDRM in the TD architecture acts as a host for the TDs and has full control of the cores and other platform hardware. A TDRM assigns software in a TD with logical processor(s). The TDRM, however, cannot access a TD's execution state on the assigned logical processor(s). Similarly, a TDRM assigns physical memory and I/O resources to the TDs, but is not privy to access the memory state of a TD due to the use of separate encryption keys enforced by the CPU(s) per TD, and other integrity and replay controls on memory. Software executing in a TD operates with reduced privileges so that the TDRM can retain control of platform resources. However the TDRM cannot affect the confidentiality or integrity of the TD state in memory or in the CPU structures under defined circumstances.

In one implementation, TDX enables each TD to have dedicated and exclusive encryption keys to encrypt the respective TD's private memory contents. The CPU supports a limited number of memory encryption keys that can be used at any given time; as a result, the CPU should manage encryption keys efficiently to enable running multiple TDs within a host system concurrently. The TDRM manages the assignment of HKIDs to TDs, configuration of keys on the memory encryption engines, and flushing of CPU caches. However, the TDRM is not in the Trusted Computing Base (TCB) (e.g. the TCB of a system refers to a set of hardware, firmware, and/or software components that have an ability to influence the trust for the overall operation of the system, and be viewed as tenant specific) of the TD and as such should not have direct access to TD's encryption keys. TDX allows the TDRM to perform key management by manipulating key identifiers, while enforcing secure operations by isolating the actual encryption mechanism and keys from the TDRM into protected memory accessible by the CPU.

Conventional systems for protecting and managing encryption keys in virtualized systems do not completely isolate the encryption logic out of the VMM access space. Furthermore, conventional systems may not utilize CPU or protected memory to handle the encryption and other TD security mechanisms that implementations of the disclosure offer. The TDX architecture of implementations of the disclosure provides isolation of encryption key management from direct access of the TDRM by allowing the TDRM to manipulate and manage only encryption key identifiers, while moving the actual encryption mechanism and keys into protected memory accessible by the CPU.

Implementations provide a technical improvement over conventional systems by providing efficient encryption key management of TDs by the TDRM while meeting security and functionality requirements of the TDX. In addition, the TDX architecture is scalable to multiple TDs, which can support multiple tenant workloads. Furthermore, the TD architecture described herein is generic and can be applied to any dynamic random access memory (DRAM), or storage class memory (SCM)-based memory, such as Non-Volatile Dual In-line Memory Module (NV-DIMM). As such, implementations of the disclosure allow software to take advantage of performance benefits, such as NVDIMM direct access storage (DAS) mode for SCM, without compromising platform security requirements. Secure encryption key management in trust domains improves the security of computer systems by allowing the TDRM to perform key management via key identifiers, while enforcing secure operations by isolating the actual encryption mechanism and keys from the TDRM into protected memory accessible by the CPU.

FIG. 1 is a schematic block diagram of a computing system 100 that provides isolation in virtualized systems using TDs, according to an implementation of the disclosure. The virtualization system 100 includes a virtualization server 110 that supports a number of client devices 101A-101C. The virtualization server 110 includes at least one processor 112 (also referred to as a processing device) that executes a TDRM 180. The TDRM 180 may include a VMM (may also be referred to as hypervisor) that may instantiate one or more TDs 190A-190C accessible by the client devices 101A-101C via a network interface 170. The client devices 101A-101C may include, but are not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. The one or more client devices 101A-101C may be communicably coupled to the virtualization server 110 via a network (not shown).

As discussed above, a TD may refer to a tenant (e.g., customer) workload. The tenant workload can include an OS alone along with other ring-3 applications running on top of the OS, or can include a VM running on top of a VMM along with other ring-3 applications, for example. In implementations of the disclosure, each TD may be cryptographically-isolated in memory using one or more separate exclusive keys for encrypting the memory (holding code and data) associated with the TD.

The processor 112 may include one or more cores 120 (also referred to as processing cores 120), range registers 130, a memory management unit (MMU) 140, output port(s) 150, trust domain control structure(s) (TDCS) 124, and trust domain thread control structure(s)(TDTCS) 128. The processor 112 may be used in a system that includes, but is not limited to, a desktop computer, a tablet computer, a laptop computer, a netbook, a notebook computer, a PDA, a server, a workstation, a cellular telephone, a mobile computing device, a smart phone, an Internet appliance or any other type of computing device. In another implementation, the processor 112 may be used in a SoC system.

The computing system 100 is representative of processing systems based on the PENTIUM III™, PENTIUM 4™, Xeon™, Itanium, XScale™ and/or StrongARM™ microprocessing devices available from Intel Corporation of Santa Clara, California, although other systems (including PCs having other microprocessing devices, engineering workstations, set-top boxes and the like) may also be used. In one implementation, sample system 100 executes a version of the WINDOWS™ operating system available from Microsoft Corporation of Redmond, Washington, although other operating systems (UNIX and Linux for example), embedded software, and/or graphical user interfaces, may also be used. Thus, implementations of the disclosure are not limited to any specific combination of hardware circuitry and software.

The one or more processing cores 120 execute instructions of the system. The processing core 120 includes, but is not limited to, pre-fetch logic to fetch instructions, decode logic to decode the instructions, execution logic to execute instructions and the like. In an implementation, the computing system 100 includes a component, such as the processor 112 to employ execution units including logic to perform algorithms for processing data.

The virtualization server 110 includes a main memory 114 and a secondary storage 118 to store program binaries and OS driver events. Data in the secondary storage 118 may be stored in blocks referred to as pages, and each page may correspond to a set of physical memory addresses. The virtualization server 110 may employ virtual memory management in which applications run by the core(s) 120, such as the TDs 190A-190C, use virtual memory addresses that are mapped to guest physical memory addresses, and guest physical memory addresses are mapped to host/system physical addresses by a MMU 140.

The core 120 may execute the MMU 140 to load pages from the secondary storage 118 into the main memory 114 (which includes a volatile memory and/or a non-volatile memory) for faster access by software running on the processor 112 (e.g., on the core). When one of the TDs 190A-190C attempts to access a virtual memory address that corresponds to a physical memory address of a page loaded into the main memory 114, the MMU 140 returns the requested data. The core 120 may execute the VMM portion (not shown) of TDRM 180 to translate guest physical addresses to host physical addresses of main memory, and provide parameters for a protocol that allows the core 120 to read, walk, and interpret these mappings.

In one implementation, processor 112 implements a TD architecture and ISA extensions (TDX) for the TD architecture. The TD architecture provides isolation between TD workloads 190A-190C and from CSP software (e.g., TDRM 180 and/or a CSP VMM (e.g., root VMM 180)) executing on the processor 112). Components of the TDX architecture can include 1) memory encryption engine 145, 2) a resource management capability referred to herein as the TDRM 180, 3) TD control structures (i.e., TDCS 124 and TDTCS 128), and 4) encryption key management capabilities in the processor 112 provided via a group of micro-architecture tables including a) a key ownership table (KOT) 160, b) a key encryption table (KET) 132, c) a write-back and invalidate table (WBT) 134, d) a key ID mapping table (KMT) 155. Further discussion of the relationships between the KOT 160, the KET 132, and KMT 155 key management tables is provided below with respect to FIG. 2. The WBT 134 is used to write back and invalidate cache hierarchies at least for HKIDs marked as reclaimed.

The TDX architecture provides an ability of the processor 112, through the micro-architectural tables 160, 132, 134, 155, as well as a set of instructions, to implement the encryption logic in a way that ensures secure operations of the TDs 190A-190C within the host system. These instructions support per-TD ephemeral random key generation, assignment of HKIDs from the global pool to a TD, configuration of the memory encryption engine, reclamation of HKIDs from a TD back to the global pool, and secure flushing of any cache that may still hold data encrypted using reclaimed HKIDs.

In implementations of the disclosure, the TDRM 180 acts as a host and has full control of the cores 120 and other platform hardware. A TDRM 180 assigns software in a TD 190A-190C with logical processor(s). The TDRM 180, however, cannot access a TD's 190A-190C execution state on the assigned logical processor(s). Similarly, a TDRM 180 assigns physical memory and I/O resources to the TDs 190A-190C, but is not privy to access the memory state of a TD 190A due to separate encryption keys, and other integrity and replay controls on memory.

With respect to the separate encryption keys, the processor may utilize the memory encryption engine 145 to encrypt (and decrypt), using the separate encryption keys, memory used during execution. For example, when the memory encryption engine 145 is used in the TDX architecture, the CPU enforces that all pages of TD memory are encrypted using a TD-specific key.

Each TD 190A-190C is a software environment that supports a software stack consisting of VMs (e.g., using virtual machine extensions (VMX)), OSes, and/or application software (hosted by the OS). Each TD 190A-190C operates independently of other TDs 190A-190C and uses logical processor(s), memory, and I/O assigned by the TDRM 180 on the platform. Software executing in a TD 190A-190C operates with reduced privileges so that the TDRM 180 can retain control of platform resources; however the TDRM cannot affect the confidentiality or integrity of the TD 190A-190C under defined circumstances.

Implementations of the disclosure are not limited to conventional computer systems, such as desktop, laptop, and/or server computer systems. Alternative implementations of the disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processing device (DSP), system on a chip, network computers (NetPC), set-top boxes, network hubs, wide area network (WAN) switches, or any other system that can perform one or more instructions in accordance with at least one implementation.

One implementation may be described in the context of a single processing device desktop or server system, but alternative implementations may be included in a multiprocessing device system. Computing system 100 may be an example of a 'hub' system architecture. The computing system 100 includes a processor 112 to process data signals. The processor 112, as one illustrative example, includes a complex instruction set computer (CISC) microprocessing device, a reduced instruction set computing (RISC) microprocessing device, a very long instruction word (VLIW) microprocessing device, a processing device implementing a combination of instruction sets, or any other processing device, such as a digital signal processing device, for example. The processor 112 is coupled to a processing device bus that transmits data signals between the processor 112 and other components in the computing system 100, such as main memory 114 and/or secondary storage 118, storing instruction, data, or any combination thereof. The other components of the computing system 100 may include a graphics accelerator, a memory controller hub, an I/O controller hub, a wireless transceiver, a Flash BIOS, a network controller, an audio controller, a serial expansion port, an I/O controller, etc. These elements perform their conventional functions that are well known to those familiar with the art.

In one implementation, processor 112 includes a Level 1 (L1) internal cache memory. Depending on the architecture, the processor 112 may have a single internal cache or multiple levels of internal caches. Other implementations include a combination of both internal and external caches depending on the particular implementation and needs. A register file is to store different types of data in various registers including integer registers, floating point registers, vector registers, banked registers, shadow registers, checkpoint registers, status registers, configuration registers, and instruction pointer register.

It should be noted that the execution unit may or may not have a floating point unit. The processor 112, in one implementation, includes a microcode (ucode) ROM to store microcode, which when executed, is to perform algorithms for certain macroinstructions or handle complex scenarios. Here, microcode is potentially updateable to handle logic bugs/fixes for processor 112.

Alternate implementations of an execution unit may also be used in micro controllers, embedded processing devices, graphics devices, DSPs, and other types of logic circuits. System 100 includes a main memory 114 (may also be referred to as memory 114). Main memory 114 includes a DRAM device, a static random access memory (SRAM) device, flash memory device, or other memory device. Main memory 114 stores instructions and/or data represented by data signals that are to be executed by the processor 112. The processor 112 is coupled to the main memory 114 via a processing device bus. A system logic chip, such as a memory controller hub (MCH) may be coupled to the processing device bus and main memory 114. An MCH can provide a high bandwidth memory path to main memory 114 for instruction and data storage and for storage of graphics commands, data and textures. The MCH can be used to direct data signals between the processor 112, main memory 114, and other components in the system 100 and to bridge the data signals between processing device bus, memory 114, and system I/O, for example. The MCH may be coupled to memory 114 through a memory interface. In some implementations, the system logic chip can provide a graphics port for coupling to a graphics controller through an Accelerated Graphics Port (AGP) interconnect.

The computing system 100 may also include an I/O controller hub (ICH). The ICH can provide direct connections to some I/O devices via a local I/O bus. The local I/O bus is a high-speed I/O bus for connecting peripherals to the memory 114, chipset, and processor 112. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another implementation of a system, the instructions executed by the processing device core 120 described above can be used with a system on a chip. One implementation of a system on a chip comprises of a processing device and a memory. The memory for one such system is a flash memory. The flash memory can be located on the same die as the processing device and other system components. Additionally, other logic blocks such as a memory controller or graphics controller can also be located on a system on a chip.

Figure 2:
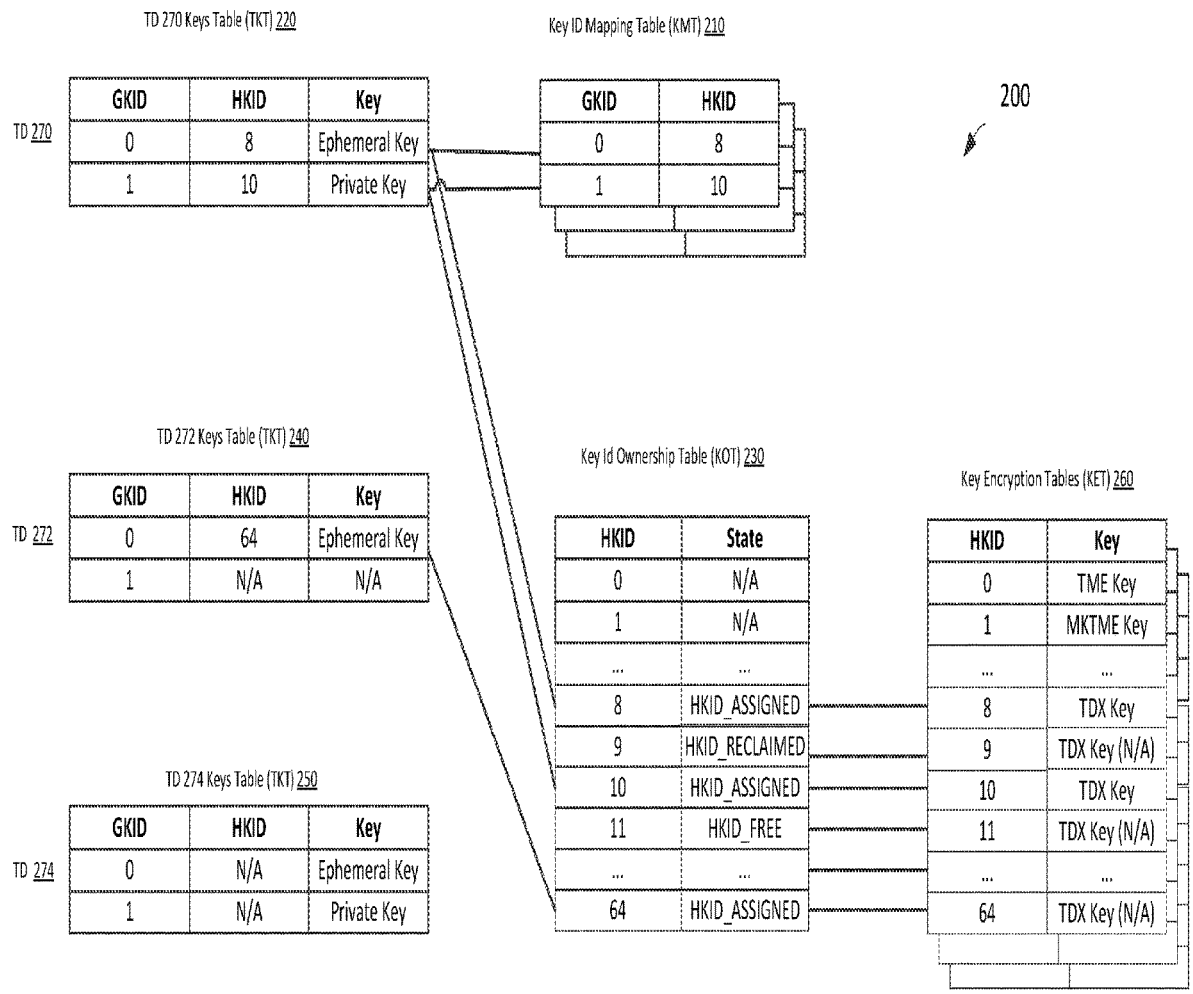
FIG. 2 is a block diagram of a detailed view of the relationships between the micro-architectural tables utilized for encryption key management according to one implementation.

FIG. 2 is a block diagram of a detailed view 200 of the relationships between the various micro-architectural tables utilized for encryption key management, according to one implementation. The CPU handles the TDX key management functionality through multiple micro-architectural tables. Examples of micro-architectural tables are depicted in Table 1 below. In one implementation, the tables may reside directly on the host hardware. In another implementation, the tables may reside in protected memory in the TD control structure (TDCS), such as TDCS 124 of FIG. 1. The TDCS is an access-controlled structure that is part of the CPU ISA, and as such is managed and accessed by the processor. The micro-architectural tables handling the TDX key management functionality may not be directly accessible by software running on the host system.

TD 270 is an example of a TD that has two encryption keys, both with two assigned HKIDs and both have been configured using a TD key configuration instruction, such as the TDConfigKey instruction. In this case, the TKT table 220 for TD 270 includes the association of an encryption key to each HKID. This table may be accessed by the CPU, but it may not be accessed by the TD or any TD software. The KMT 210 includes the mapping of a guest key identifier (GKID) to each HKID, on the logical processor (LP) scope, indicating that the encryption key has been configured and that the TD memory is ready to be accessed by the TD. A GKID may refer to a guest key identifier assigned to an encryption key in the TD scope when the TD created the encryption key.

The KOT 230 includes the state of each HKID. As illustrated in FIG. 2, each of the HKIDs assigned to TD 270 (e.g., HKIDs 8 and 10) has a state of "HKID_ASSIGNED" in the KOT 230. In one example, HKID_ASSIGNED refers to an HKID that has been assigned to a TD, HKID_FREE refers to an HKID that is not assigned to any TD and is ready to be assigned to a TD, and HKID_RECLAIMED refers to an HKID that has been reclaimed from a TD, but is not yet ready to be assigned to a new TD. The KET 260 is accessible by the memory encryption engine. It indicates whether an HKID is within the range dedicated for TDX usage, and whether the key identified by the HKID has been configured in the memory encryption engine. In one example, TDX Key refers to an HKID that is within the range dedicated for TDX usage and TME Key and MKTME Key refer to HKIDs outside the range dedicated for TDX usage.

TD 272 is an example of a TD that has one ephemeral encryption key. The key has been assigned an HKID but has not yet been configured using the TD key configuration instruction (e.g., TDConfigKey). In this case, the TKT table 240 for TD 272 includes the association of the ephemeral encryption key to the HKID and to a GKID. The KMT 210 does not include an entry for the mapping of the GKID to the HKID because the encryption key has not yet been configured in the memory encryption engine. The KOT 230 includes the state of each HKID, thus HKID 64 assigned to TD 272 has a state of HKID_ASSIGNED in the KOT 230. The KET 260 indicates that HKID 64 is within the range dedicated for TDX usage. The KET 260 also shows that the HKID has not been configured in the memory encryption engine yet.

TD 274 is an example of a TD that has encryption keys but does not have any assigned HKIDs. In this case, TD 274 does not have any entries in the micro-architectural tables until at least one HKID is assigned to one of the encryption keys of the TD.

TABLE 1

TDX key management tables

| Table | Scope | Description |
|---|---|---|
| Key Encryption Table (KET) 260 | Package | Micro-architectural table for configuring the encryption engine. The KET is indexed by HKID. Cryptographic engines on a package are configured similarly. A KET entry in the range supporting TDX HKIDs is configured per package by the TDCONFIGKEY instruction. A KET entry in the legacy range is configured per package by the legacy PCONFIG instruction. Note: KET is part of the legacy MK-TME architecture |
| KeyID Ownership Table (KOT) 230 | Platform | Micro-architectural table for managing the TDX HKIDs inventory. This table may assign HKIDs to TDs, revoke HKIDs from TDs, and control processor cache flush. KOT is indexed by HKID. In some implementations, the KOT entries in the configured TDX HKIDs range are used in TDX key management. |

TABLE 1-continued

TDX key management tables

| Table | Scope | Description |
|---|---|---|
| WBINVD Table (WBT) (not shown in FIG. 2) | Package or Core | Micro-architectural table for controlling the operation of restartable TDWBINVD. |
| TD Keys Table (TKT) 220, 240, 250 | TD | Table in TDCS for associating a GKID, a HKID, and an encryption key for a TD. The table is indexed by GKID. |
| Key ID Mapping Table (KMT) 210 | LP | Micro-architectural table for configuring the hardware for mapping GKIDs to HKIDs during address translation by the TDENTER instruction. |

Figure 3:
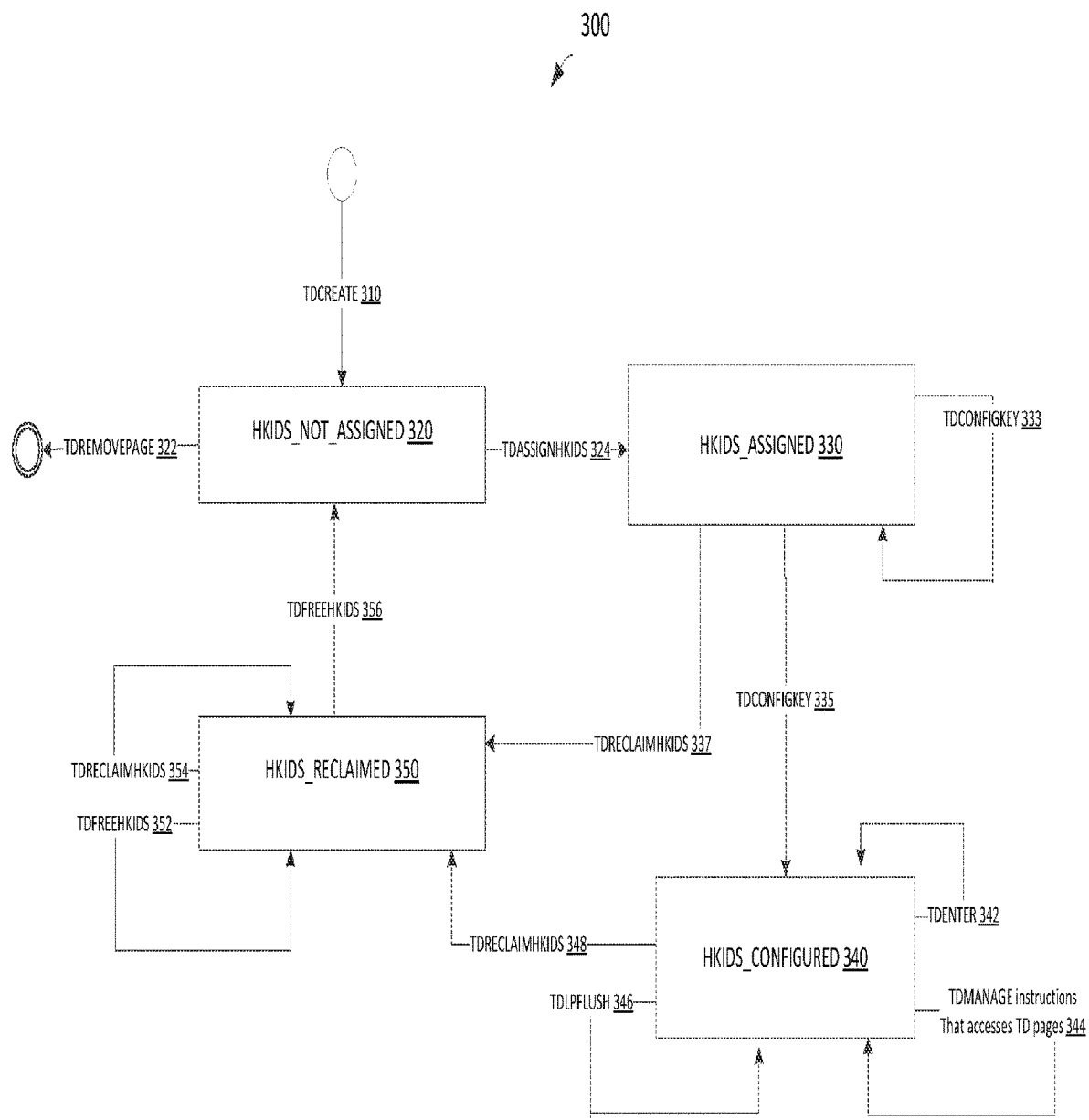
FIG. 3 is a state machine diagram representing the state of a trust domain (TD) in terms of encryption key management according to one implementation.
Figure 4:
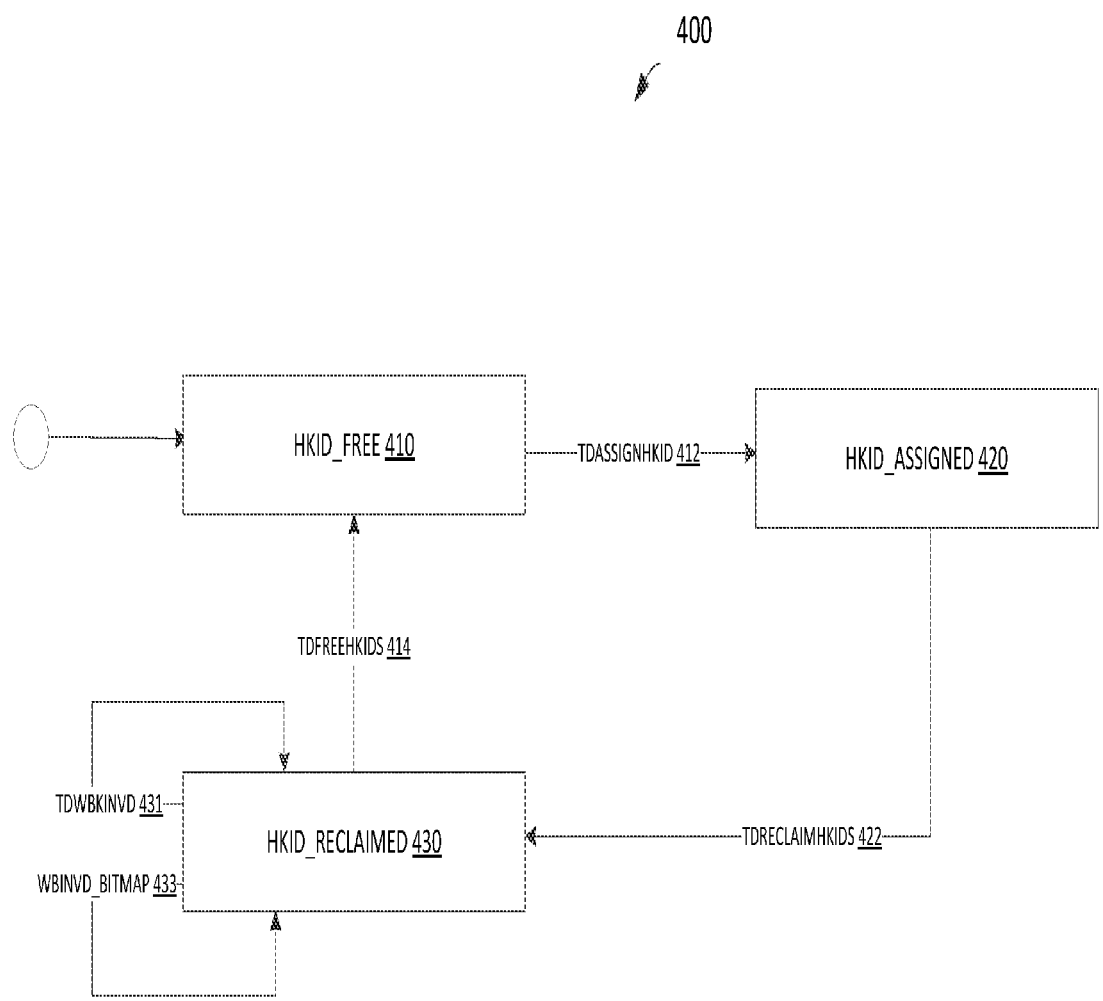
FIG. 4 is a state machine diagram representing the state of a host key identifier (HKID) in the global scope of key management according to one implementation.

FIGS. 3 and 4 are state machine diagrams representing the TD scope and the global scope of encryption key management, respectively, according to implementations of the disclosure. The global scope of key management refers to the inventory of HKIDs managed using the KOT. The TD scope refers to the inventories of HKIDs assigned to TDs, where TD keys are configured in the memory encryption engine, and HKIDs are reclaimed from TDs. When an HKID from the KOT is assigned to a TD, the TD scope and the global scope interact and overlap for that HKID because the TD has exclusive access to the HKID. When the HKID is reclaimed from the TD at later time, the interaction between the global scope and the TD scope may cease to exist. This separation between the TD Scope and the global scope allows software to perform lazy cache flush sequences, grouping together the flushing of multiple HKIDs.

With respect to FIG. 3, a state machine diagram 300 is illustrated representing the state of a TD in terms of encryption key management, according to one implementation. A TD may be in one of four states at any given point in time, as depicted in Table 2 below. The four states include a HKIDS_NOT_ASSIGNED state 320, a HKIDS_ASSIGNED state 330, a HKIDS_CONFIGURED state 340, and a HKIDS_RECLAIMED state 350. The state that the TD is in depends upon the status of the HKID assignment to the TD. A TD is in a HKIDS_NOT_ASSIGNED state when an HKID is not assigned or when a HKID is reclaimed and processor cache is flushed for entries encrypted with this HKID. A TD is in a HKIDS_ASSIGNED state when an HKID is assigned to the TD but the TD's encryption key has not yet been configured in the memory encryption engine. A TD is in a HKIDS_RECLAIMED state when an HKID is reclaimed from the TD but processor cache is not yet flushed for this entries encrypted with this HKID. A TD is in a HKIDS_CONFIGURED state when an HKID is assigned to the TD and TD's encryption key has been configured in memory encryption engine.

TABLE 2

TD possible states in terms of key management

| TD State | Any HKID Assigned to TD? | TD Keys Configured on the processor? | TD memory can be accessed? | Any TD data cached? |
|---|---|---|---|---|
| HKIDS_NOT_ASSIGNED | No | No | No | No |
| HKIDS_ASSIGNED | Yes | Not All | No | No |
| HKIDS_CONFIGURED | Yes | Yes | Yes | Yes |
| HKIDS_RECLAIMED | Yes | Yes | No | Yes |

When a TD gets created by the TDCREATE instruction 310, the TD may be in the HKIDS_NOT_ASSIGNED state 320 with no HKID assigned to the TD yet. Further, the TD may not access its TD memory and the virtual processor (vCPU) of the TD may not run at this state. Accordingly, the processor cache may not have data for the TD. The TDCREATE instruction 310 acquires exclusive access to the TDCS.

Upon execution of the instruction TDASSIGNHKIDS 324, a change of the TD state to HKIDS_ASSIGNED 430 results. In this state, one or more HKIDs are assigned to one or more TD keys, but some TD keys may not have been configured on all packages yet. Further, the TD may not access its TD memory and the TD's vCPU may not run at this state. Accordingly, the processor cache may not have data for the TD. The TDCONFIGKEY instruction 333 continues to be executed until the TD key is configured on all packages. The TDASSIGNHKIDS instruction 324 acquires exclusive access to the TDCS.

When the TDCONFIGKEY instruction 335 has been executed on all packages at 335, resulting in all keys being configured in the memory encryption engine of each package, the TD is in the HKIDS_CONFIGURED state 340. In this state 340, the TD memory may be accessed by the TD and TD's vCPU may run. The processor cache may also contain TD data. The TD may continue to run in this state until at least one HKID is reclaimed from the TD. The TDCONFIGKEY instruction 335 acquires shared access to the TDCS. The creation, assignment and configuration of encryption key instructions are summarized in Table 3 below.

TABLE 3

Encryption key creation, assignment, and configuration instructions

| Instruction | Scope | Execute Per | Description |
|---|---|---|---|
| TDCREATE | TD | One logical processor (LP) | Create the TDCS and generate the TD's random ephemeral key |
| TDASSIGNHKID | TD, KOT | One LP | Given a FREE HKID entry in the KOT, mark it as ASSIGNED and store it in the TDCS |
| TDCONFIGKEY | TD | Each package and each TD key | Configure a key for the TD on the package |

When the TDRM determines that the number of unassigned HKIDs in the KOT is below a threshold, the TDRM may reclaim the one or more HKIDs that are assigned to the TD by executing TDRECLAIMHKIDS 348 or 337. The threshold may be a configurable parameter associated with the TDRM. The TDRM reclaims the HKIDs by returning them to the global pool in KOT, decoupling them from the TD, and marking the KOT entry for reclaimed HKIDs as unassigned. There may still be cache entries associated with the reclaimed HKIDs, so they are not yet free to be assigned to any TD. This results in changing the TD state to HKIDS_RECLAIMED 350. In this state, the TD memory may not be accessed by the TD and TD's vCPU may not run because one or more HKIDs that were previously assigned to the TD are now reclaimed. The processor cache may still contain TD data that was encrypted by the one or more reclaimed HKIDs. The TDRECLAIMHKIDS instruction 348 acquires exclusive access to the TDCS. The key reclaiming instructions are described in Table 4 below.

TABLE 4

TD reclaim key instructions

| Instruction | Scope | Execute Per | Description |
| --- | --- | --- | --- |
| TDLPFLUSH | TD | Each LP | Flush TLB for the TLB ASID |
| TDRECLAIMHKYIDS | TD, KOT | One LP | Reclaim the TD's HKID. Mark the HKID as RECLAIMED in the KOT |

The TDRM executes TDFREEHKIDS 356 after reclaiming HKIDs to flush any processor cache that is associated with the reclaimed HKIDs. When processor cache is flushed, the TD state is back to HKIDS_NOT_ASSIGNED, and the reclaimed HKIDs are free to be assigned to any TD. The cache flush operation runs in the global scope and is decoupled from the TD, therefore the TDRM may choose to implement it in a lazy fashion, i.e., wait until a certain number of HKIDs in the KOT become RECLAIMED. In the HKIDS_NOT_ASSIGNED 320 state, the TD memory may not be accessed by the TD and TD's vCPU may not run. The processor cache may not contain TD data. The TDFREEHKIDS instruction 356 acquires exclusive access to the TDCS.

After flushing the processor's cache, the TDRM frees the TD memory by executing TDREMOVEPAGE 322 on the memory pages allocated for the TD.

FIG. 4 is a state machine diagram 400 representing the state of an HKID in the global scope of key management, according to one implementation. An HKID may be in one of three states at any given point in time, as depicted in Table 5 below. The state of each HKID is maintained by the CPU in the KOT. As part of maintaining the state of an HKID, the CPU may also control the process of flushing cached data that is associated with the HKID. For example, an HKID may not be assigned to a TD if there is data in a cache associated with the HKID.

The three states of an HKID include a HKID_FREE state 410, a HKID_ASSIGNED state 420, a HKID_RECLAIMED state 430. The state that the HKID is in depends upon the status of the HKID assignment to an TD. An HKID is in a HKID_FREE state when the HKID is not assigned to any TD, or when the HKID is reclaimed from a TD and processor cache is flushed for entries encrypted with this HKID. An HKID is in a HKID_ASSIGNED state when the HKID is assigned to a TD. An HKID is in a HKID_RECLAIMED state when the HKID is reclaimed from a TD after having been assigned to it previously.

TABLE 5

HKID in KOT entry possible states

| HKID State | HKID Assigned to a TD? | Any Data Cached with this HKID? | New Cache Lines may be Created with this HKID? | Comments |
| --- | --- | --- | --- | --- |
| HKID_FREE | No | No | No | |
| HKID_ASSIGNED | Yes | Yes | Yes | |
| HKID_RECLAIMED | Yes | Yes | No | An additional sub-state WBINVD_BITMAP tracks the cache flush operation on multiple packages/cores |

The initial state of an HKID is HKID_FREE 410. In this state, the HKID is not assigned to a TD and the processor cache may not have data associated with the HKID.

When the TDASSIGNHKID 412 instruction is executed, the HKID state changes to HKID_ASSIGNED 420. In this state 420, the HKID is assigned to a TD. A free HKID may be assigned to a TD if the HKID is designated in KOT to be used for TD private memory encryption. After assigning the HKID to the TD, the TD may create a processor cache line associated with the HKID. The TDASSIGNHKID instruction 412 may mark the HKID in the KOT as assigned, thus signaling that the TDRM is to remove the HKID from the list of HKIDs assignable by the TDRM to other TDs. The TDASSIGNHKID instruction 412 acquires exclusive access to the KOT.

When the TDRM determines that the number of unassigned HKIDs in the KOT is below a threshold, the TDRM may reclaim an HKID from a TD by executing TDRECLAIMHKIDS 422. The threshold may be a configurable parameter associated with the TDRM. The TDRM reclaims the HKID by returning it to the global pool in KOT, decoupling them from the TD, and marking the KOT entry for reclaimed HKID as free. This results in changing the HKID state to HKID_RECLAIMED 430. The HKID is no longer assigned to a TD, but there may still be cache entries associated with the reclaimed HKID. The TDRECLAIMHKIDS instruction 422 acquires exclusive access to the KOT.

The TDRM executes TDFREEHKIDS instruction 414 after reclaiming an HKID to flush any processor cache line(s) that is associated with the reclaimed HKID, as described in Table 6 below. Flushing the cache lines also involve executing the TDWBINVD 431 and WBINVD_BITMAP 433 instructions to cause the processor to write back and invalidate the cache hierarchy, at least for the reclaimed HKID. In many cases, the TDWBINVD 431 instruction execution time is long; it can be interruptible by external events and may be restarted by the TDRM until completed. When processor cache is flushed, the HKID state is set back to HKID_FREE 410, and the reclaimed HKID may be assigned to any TD. The cache flush operation runs in the global scope and is decoupled from the TD, therefore the TDRM may choose to implement it in a lazy fashion, i.e., wait until a certain number of HKIDs in the KOT become RECLAIMED. In the HKID_FREE 410 state, the HKID is not assigned to a TD and no cache line associated with the HKID may exist. The TDFREEHKIDS instruction 414 acquires exclusive access to the KOT.

TABLE 6

Processor cache flush sequence

| Instruction | Scope | Execute Per | Description |
|---|---|---|---|
| TDWBINVD | KOT | Each package or core | Write back and invalidate cache hierarchy, at least for the HKID marked as RECLAIMED. The instruction execution time is long; it is interruptible by external events and may be restarted until completed. |
| TDFREEHKIDS | TD, KOT | One LP | Mark all the TD's RECLAIMED HKIDs as FREE |

TABLE 7

TD key reassignment sequence

| Instruction | Impacts | Execute Per | |
|---|---|---|---|
| TDASSIGNHKID | TD, KOT | One LP | Choose a FREE HKID entry in the KOT, mark it as ASSIGNED and set it in the TDCS |
| TDCONFIGKEY | TD | package and TD key | Configure a TD key on the package |

Figure 5:
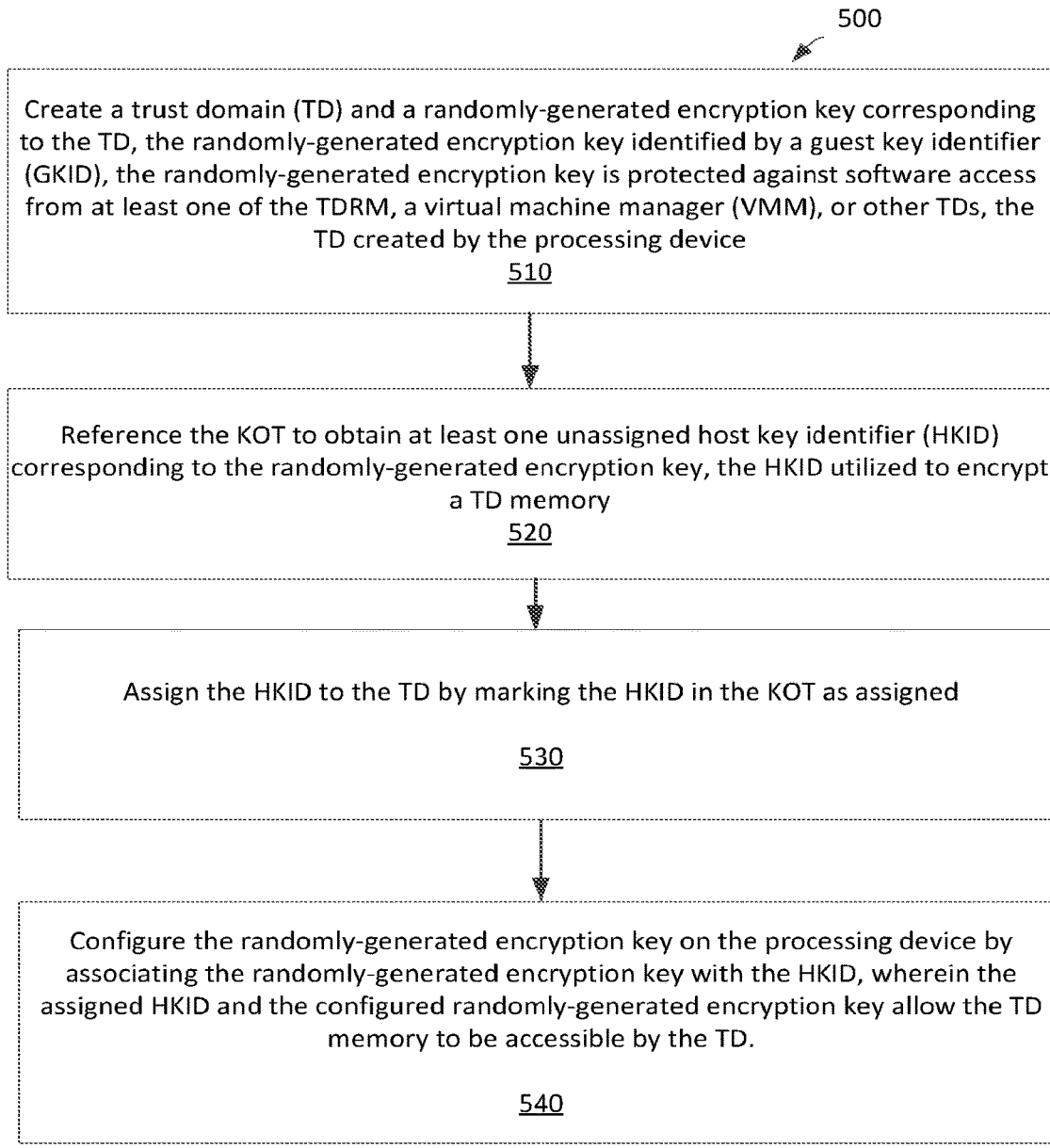
FIG. 5 is a flow diagram of an example method for providing secure encryption key management in trust domain extensions (TDX) technology according to one implementation.

FIG. 5 is a flow diagram of an example method 500 for providing secure encryption key management in trust domains according to one implementation. Method 500 may be performed by processing logic that may comprise hardware (e.g., circuitry, dedicated logic, programmable logic, microcode, etc.), software (such as operations being performed by the MCU), firmware or a combination thereof. In one implementation, method 500 is performed by processing device 112 of FIG. 1. In another implementation, the method 500 is performed by any of the processing devices described with respect to FIGS. 7A-12. Alternatively, other components of the computing system 100 (or software executing on the processing device 112) may perform some or all of the operations of the method 500.

Referring to FIG. 5, the method 500 begins at block 510 where the processing logic executes a TDRM to create a TD and a randomly-generated encryption key corresponding to the TD, the randomly-generated encryption key identified by a GKID, the randomly-generated encryption key is protected against software access from at least one of the TDRM, a VMM, or other TDs, the TD created by the processing device.

At block 520, the processing logic references the KOT to obtain at least one unassigned HKID corresponding to the randomly-generated encryption key, the HKID utilized to encrypt a TD memory. Then, at block 530, the processing logic assigns the HKID to the TD by marking the HKID in the KOT as assigned.

Lastly, at block 540, the processing logic configures the randomly-generated encryption key on the processing device by associating the randomly-generated encryption key with the HKID, wherein the assigned HKID and the configured randomly-generated encryption key allow the TD memory to be accessible by the TD.

Figure 6A:
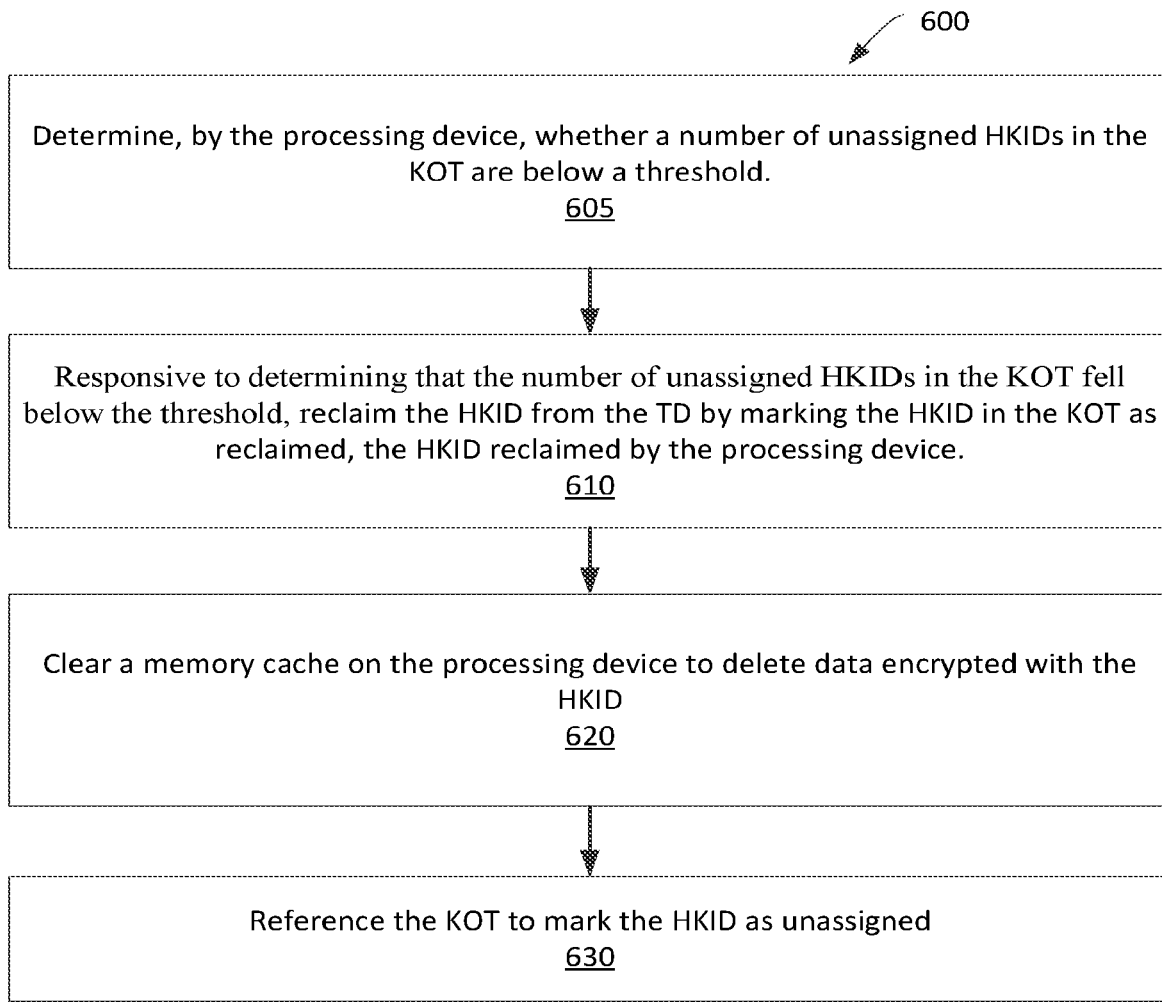
FIG. 6A is a flow diagram of an example method for reclaiming a host key identifier from a trust domain according to one implementation.

FIG. 6A is a flow diagram of an example method 600 for reclaiming a host key identifier from a trust domain according to one implementation. Method 600 may be performed by processing logic that may comprise hardware (e.g., circuitry, dedicated logic, programmable logic, microcode, etc.), software (such as operations being performed by the MCU), firmware or a combination thereof. In one implementation, method 500 is performed by processing device 112 of FIG. 1. In another implementation, the method 500 is performed by any of the processing devices described with respect to FIGS. 7A-12. Alternatively, other components of the computing system 100 (or software executing on the processing device 112) may perform some or all of the operations of the method 600.

Referring to FIG. 6A, the method 600 begins at block 605 when the processing logic executes a TDRM to determine whether a number of unassigned HKIDs in the KOT are below a threshold. Then, at block 610, responsive to determining that the number of unassigned HKIDs in the KOT fell below the threshold, the processing logic reclaims the HKID from the TD by marking the HKID in the KOT as reclaimed, the HKID reclaimed by the processing device.

Subsequently, at block 620, the processing logic clears a memory cache on the processing device to delete data encrypted with the HKID. Lastly, at block 630, the processing logic references the KOT to mark the HKID as unassigned.

FIG. 6B is a flow diagram of an example method 600B for reviving a trust domain with an assigned host key identifier according to one implementation. Method 600 may be performed by processing logic that may comprise hardware (e.g., circuitry, dedicated logic, programmable logic, microcode, etc.), software (such as operations being performed by the MCU), firmware or a combination thereof. In one implementation, method 500 is performed by processing device 112 of FIG. 1. In another implementation, the method 500 is performed by any of the processing devices described with respect to FIGS. 7A-12. Alternatively, other components of the computing system 100 (or software executing on the processing device 112) may perform some or all of the operations of the method 600B.

Referring to FIG. 6B, the method 600B begins at block 660 when responsive to reclaiming the HKID from the TD, the TDRM is to revive the TD. In one implementation, the TDRM is executed by the processing device.

Subsequently, at block 665, the TDRM assigns an unassigned HKID from the KOT to the TD.

At block 670, the TDRM configures the randomly-generated encryption key on the processing device by associating the randomly-generated encryption key with the HKID. In one implementation, the assigned HKID and the configured randomly-generated encryption key allow the TD memory to be accessible by the TD. Lastly, at block 690 the TDRM references the KOT to mark the HKID as assigned.

Figure 7A:
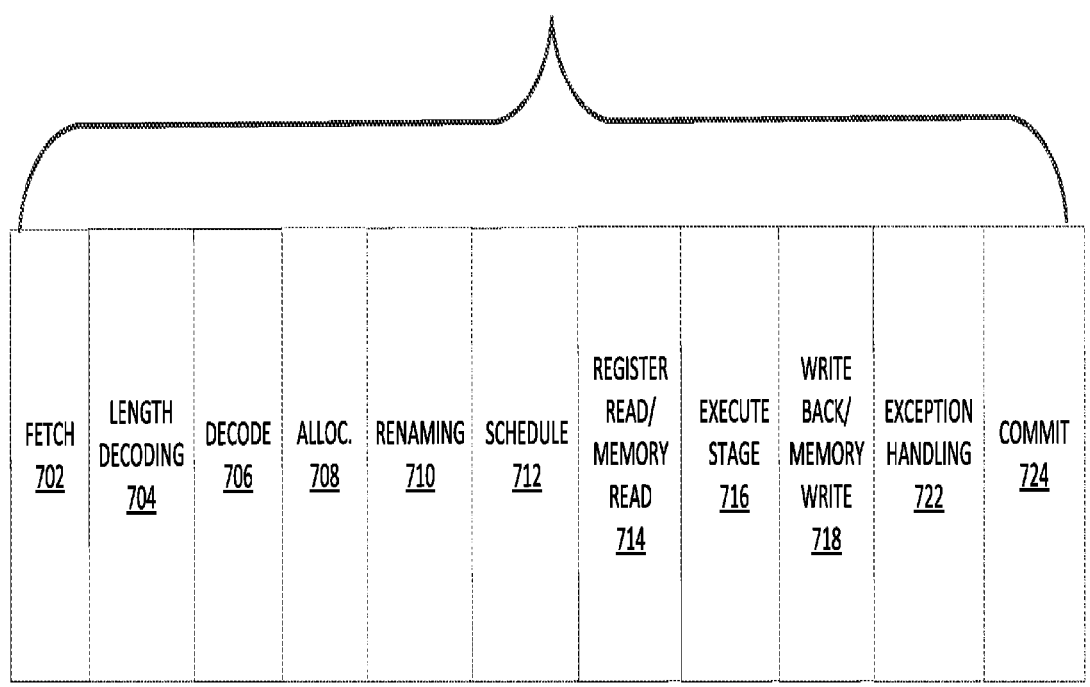
FIG. 7A is a block diagram illustrating a micro-architecture for a processor in which one implementation of the disclosure may be used.
Figure 7B:
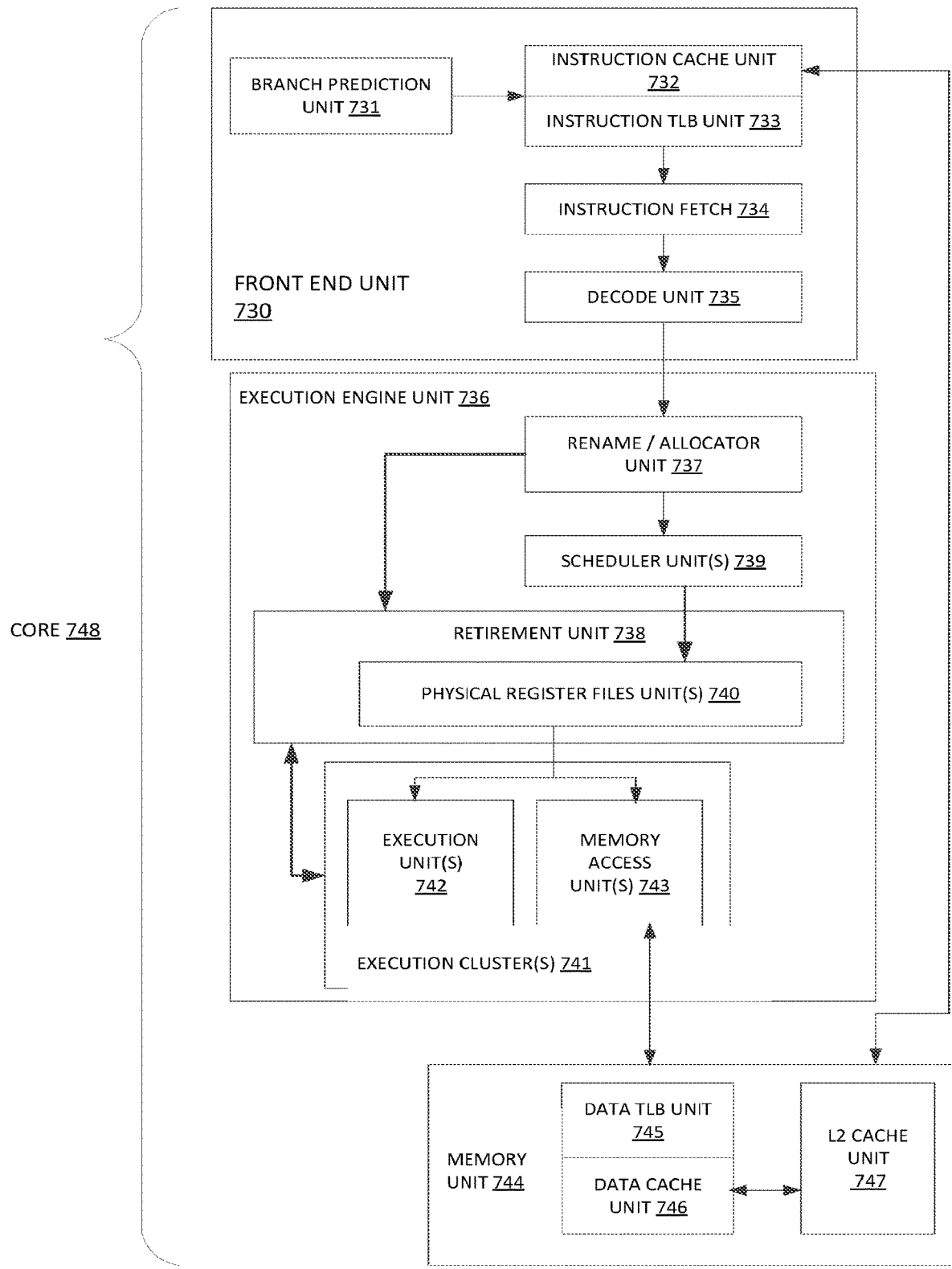
FIG. 7B is a block diagram illustrating an in-order pipeline and a register renaming stage, out-of-order issue/execution pipeline implemented according to at least one implementation of the disclosure.

FIG. 7A is a block diagram illustrating an in-order pipeline and a register renaming stage, out-of-order issue/execution pipeline of a processor monitoring performance of a processing device to provide isolation in virtualized systems using trust domains according to at least one implementation of the disclosure. FIG. 7B is a block diagram illustrating an in-order architecture core and a register renaming logic, out-of-order issue/execution logic to be included in a processor according to at least one implementation of the disclosure. The solid lined boxes in FIG. 7A illustrate the in-order pipeline, while the dashed lined boxes illustrates the register renaming, out-of-order issue/execution pipeline. Similarly, the solid lined boxes in FIG. 7B illustrate the in-order architecture logic, while the dashed lined boxes illustrates the register renaming logic and out-of-order issue/execution logic. The processor of FIGS. 7A and 7B may be the same as processor 112 for performing secure encryption key management in trust domains, according to implementations of the disclosure.

In FIG. 7A, a processor pipeline 700 includes a fetch stage 702, a length decode stage 704, a decode stage 706, an allocation stage 708, a renaming stage 710, a scheduling (also known as a dispatch or issue) schedule stage 712, a register read/memory read stage 714, an execute stage 716, a write back/memory write stage 718, an exception handling stage 722, and a commit stage 724. In some implementations, the stages are provided in a different order and different stages may be considered in-order and out-of-order.

In FIG. 7B, arrows denote a coupling between two or more units and the direction of the arrow indicates a direction of data flow between those units. FIG. 7B shows processor core (core) 790 including a front end unit 730 coupled to an execution engine unit 750, and both are coupled to a memory unit 770.

The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 734 is further coupled to a level 2 (L2) cache unit 776 in the memory unit 770. The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 758 is overlapped by the retirement unit 754 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point).

While some implementations may include a number of execution units dedicated to specific functions or sets of functions, other implementations may include one execution unit or multiple execution units that all perform all functions. The scheduler unit(s) 756, physical register file(s) unit(s) 758, and execution cluster(s) 760 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations are implemented in which the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary implementation, the memory access units 764 may include a load unit, a store address unit, and a store data unit, each of which is coupled to the data TLB unit 772 in the memory unit 770. The L2 cache unit 776 is coupled to one or more other levels of cache and eventually to a main memory.

By way of example, the exemplary register renaming, out-of-order issue/execution core architecture may implement the pipeline 700 of FIG. 7A as follows: 1) the instruction fetch 38 performs the fetch and length decoding stages 702 and 704 respectively; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with additional extensions such as NEON) of ARM Holdings of Sunnyvale, CA).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated implementation of the processor also includes a separate instruction and data cache units 734/774 and a shared L2 cache unit 776, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

Figure 8:
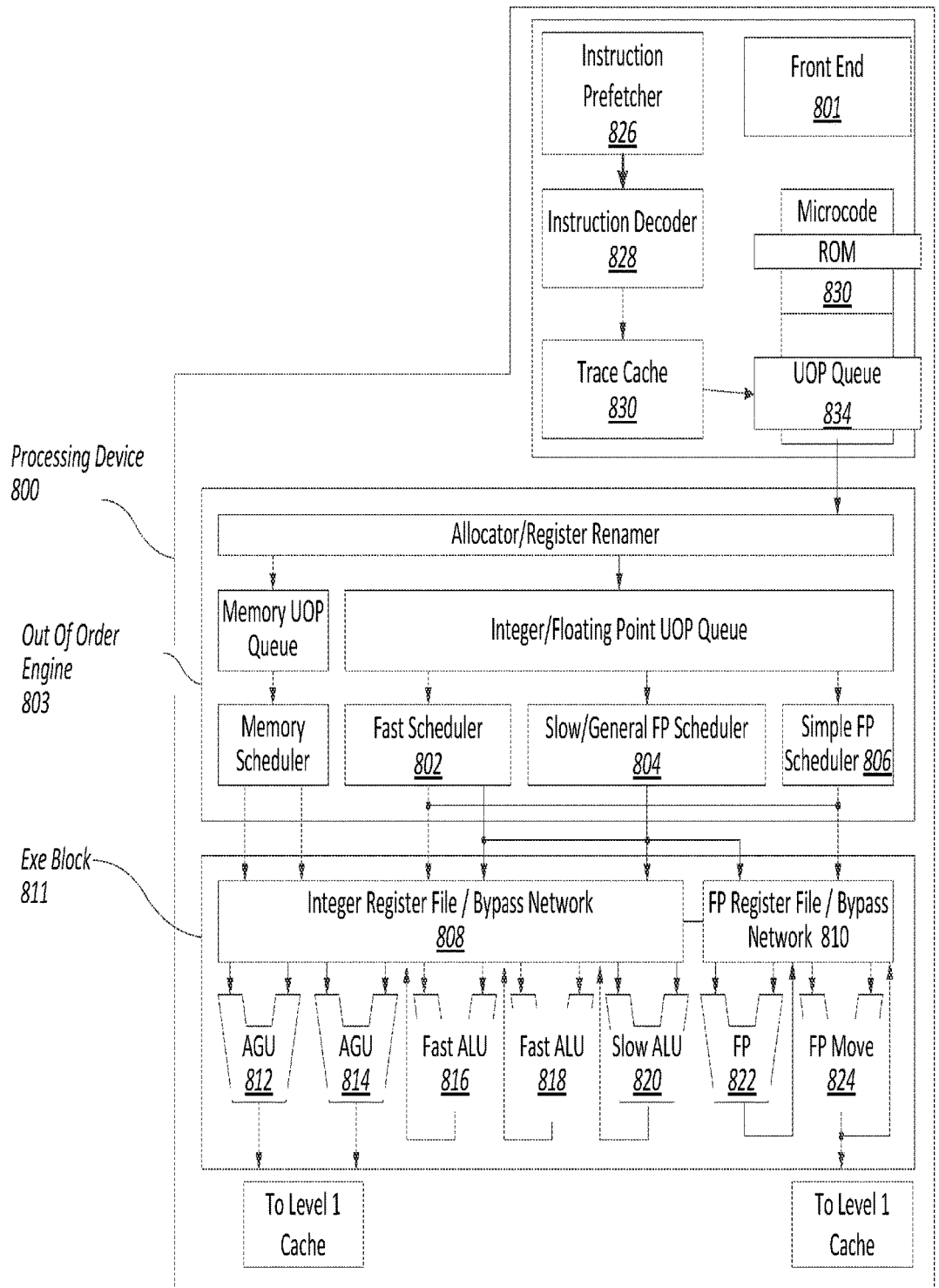
FIG. 8 illustrates a block diagram of the micro-architecture for a processing device that includes logic circuits to provide isolation in virtualized systems using trust domains according to one implementation.

FIG. 8 illustrates a block diagram of the micro-architecture for a processing device 800 that includes logic circuits to provide isolation in virtualized systems using trust domains according to one implementation. In some implementations, an instruction can be implemented to operate on data elements having sizes of byte, word, doubleword, quadword, etc., as well as datatypes, such as single and double precision integer and floating point datatypes. In one implementation the in-order front end 801 is the part of processing device 800 that fetches instructions to be executed and prepares them to be used later in the processing device pipeline. The implementations of performing secure encryption key management in trust domains can be implemented in processing device 800.

The front end 801 may include several units. In one implementation, the instruction prefetcher 816 fetches instructions from memory and feeds them to an instruction decoder 818 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 830 takes decoded uops and assembles them into program ordered sequences or traces in the uop queue 834 for execution. When the trace cache 830 encounters a complex instruction, the microcode ROM 832 provides the uops needed to complete the operation.

Some instructions are converted into a single micro-op, whereas others need several micro-ops to complete the full operation. In one implementation, if more than four micro-ops are needed to complete an instruction, the decoder 818 accesses the microcode ROM 832 to do the instruction. For one implementation, an instruction can be decoded into a small number of micro ops for processing at the instruction decoder 818. In another implementation, an instruction can be stored within the microcode ROM 832 should a number of micro-op s be needed to accomplish the operation. The trace cache 830 refers to an entry point programmable logic array (PLA) to determine a correct micro-instruction pointer for reading the micro-code sequences to complete one or more instructions in accordance with one implementation from the micro-code ROM 832. After the microcode ROM 832 finishes sequencing micro-ops for an instruction, the front end 801 of the machine resumes fetching micro-ops from the trace cache 830.

The out-of-order execution engine 803 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 802, slow/general floating point scheduler 804, and simple floating point scheduler 806. The uop schedulers 802, 804, 806, determine when a uop is ready to execute based on the readiness of their dependent input register operand sources and the availability of the execution resources the uops need to complete their operation. The fast scheduler 802 of one implementation can schedule on each half of the main clock cycle while the other schedulers can only schedule once per main processing device clock cycle. The schedulers arbitrate for the dispatch ports to schedule uops for execution.

Register files 808, 810, sit between the schedulers 802, 804, 806, and the execution units 812, 814, 816, 818, 810, 812, 814 in the execution block 811. There is a separate register file 808, 810, for integer and floating point operations, respectively. Each register file 808, 810, of one implementation also includes a bypass network that can bypass or forward just completed results that have not yet been written into the register file to new dependent uops. The integer register file 808 and the floating point register file 810 are also capable of communicating data with the other. For one implementation, the integer register file 808 is split into two separate register files, one register file for the low order 32 bits of data and a second register file for the high order 32 bits of data. The floating point register file 810 of one implementation has 128 bit wide entries because floating point instructions typically have operands from 64 to 128 bits in width.

The execution block 811 contains the execution units 812, 814, 816, 818, 810, 812, 814, where the instructions are actually executed. This section includes the register files 808, 810, that store the integer and floating point data operand values that the micro-instructions need to execute. The processing device 800 of one implementation is comprised of a number of execution units: address generation unit (AGU) 812, AGU 814, fast ALU 816, fast ALU 818, slow ALU 810, floating point ALU 812, floating point move unit 814. For one implementation, the floating point execution blocks 812, 814, execute floating point, MMX, SIMD, and SSE, or other operations. The floating point ALU 812 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 816, 818. The fast ALUs 816, 818, of one implementation can execute fast operations with an effective latency of half a clock cycle. For one implementation, most complex integer operations go to the slow ALU 810 as the slow ALU 810 includes integer execution hardware for long latency type of operations, such as a multiplier, shifts, flag logic, and branch processing. Memory load/store operations are executed by the AGUs 812, 814. For one implementation, the integer ALUs 816, 818, 810, are described in the context of performing integer operations on 64 bit data operands. In alternative implementations, the ALUs 816, 818, 810, can be implemented to support a variety of data bits including 16, 32, 128, 256, etc.

Similarly, the floating point units 812, 814, can be implemented to support a range of operands having bits of various widths. For one implementation, the floating point units 812, 814, can operate on 128 bits wide packed data operands in conjunction with SIMD and multimedia instructions.

In one implementation, the uops schedulers 802, 804, 806, dispatch dependent operations before the parent load has finished executing. As uops are speculatively scheduled and executed in processing device 800, the processing device 800 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processing device are also designed to catch instruction sequences for text string comparison operations.

The processing device 800 also includes logic to provide isolation in virtualized systems using trust domains according to one implementation. The term "registers" may refer to the on-board processing device storage locations that are used as part of instructions to identify operands. In other words, registers may be those that are usable from the outside of the processing device (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processing device using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessing devices enabled with MMX technology from Intel Corporation of Santa Clara, California. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers.

Figure 9:
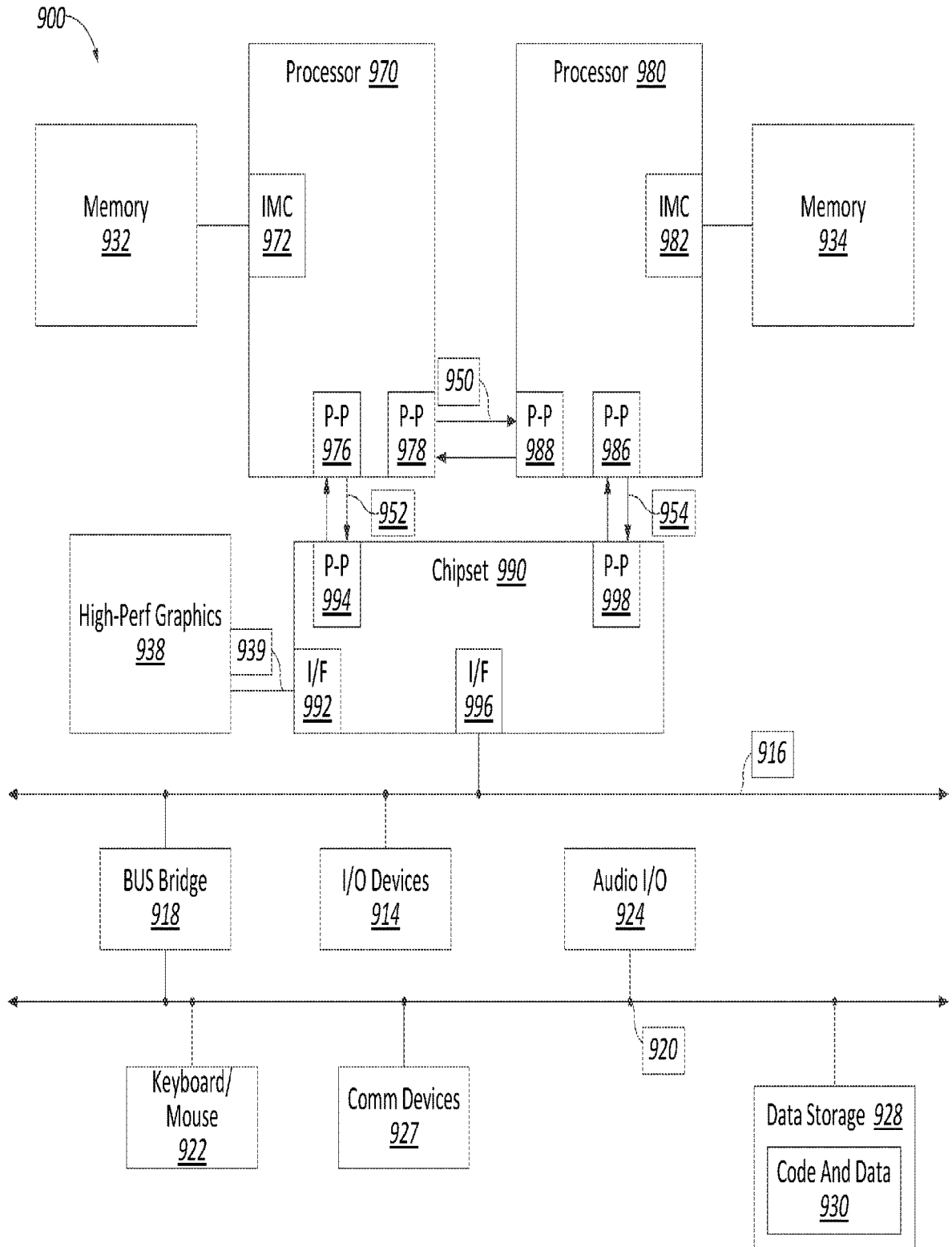
FIG. 9 is a block diagram of a computer system according to one implementation.

Implementations may be implemented in many different system types. Referring now to FIG. 9, shown is a block diagram of a multiprocessing device system 900 in accordance with an implementation. As shown in FIG. 9, multiprocessing device system 900 is a point-to-point interconnect system, and includes a first processing device 970 and a second processing device 980 coupled via a point-to-point interconnect 950. As shown in FIG. 9, each of processing devices 970 and 980 may be multicore processing devices, including first and second processing device cores (not shown), although potentially many more cores may be present in the processing devices. The processing devices each may include hybrid write mode logics in accordance with an implementation of the present. The implementations of performing secure encryption key management in trust domains can be implemented in the processing device 970, processing device 980, or both.

While shown with two processing devices 970, 980, it is to be understood that the scope of the disclosure is not so limited. In other implementations, one or more additional processing devices may be present in a given processing device.

Processing devices 970 and 980 are shown including integrated memory controller units 972 and 982, respectively. Processing device 970 also includes as part of its bus controller units point-to-point (P-P) interfaces 976 and 978; similarly, second processing device 980 includes P-P interfaces 986 and 988. Processing devices 970, 980 may exchange information via a point-to-point (P-P) interface 950 using P-P interface circuits 978, 988. As shown in FIG. 9, IMCs 972 and 982 couple the processing devices to respective memories, namely a memory 932 and a memory 934, which may be portions of main memory locally attached to the respective processing devices.

Processing devices 970, 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 939.

A shared cache (not shown) may be included in either processing device or outside of both processing devices, yet connected with the processing devices via P-P interconnect, such that either or both processing devices' local cache information may be stored in the shared cache if a processing device is placed into a low power mode.

Chipset 990 may be coupled to a first bus 916 via an interface 996. In one implementation, first bus 916 may be a Peripheral Component Interconnect (PCI) bus, or a bus such as a PCI Express bus or another third generation I/O interconnect bus, although the scope of the disclosure is not so limited.

As shown in FIG. 9, various I/O devices 914 may be coupled to first bus 916, along with a bus bridge 918 which couples first bus 916 to a second bus 920. In one implementation, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one implementation. Further, an audio I/O 924 may be coupled to second bus 920. Note that other architectures are possible. For example, instead of the point-to-point architecture of FIG. 9, a system may implement a multi-drop bus or other such architecture.

Figure 10:
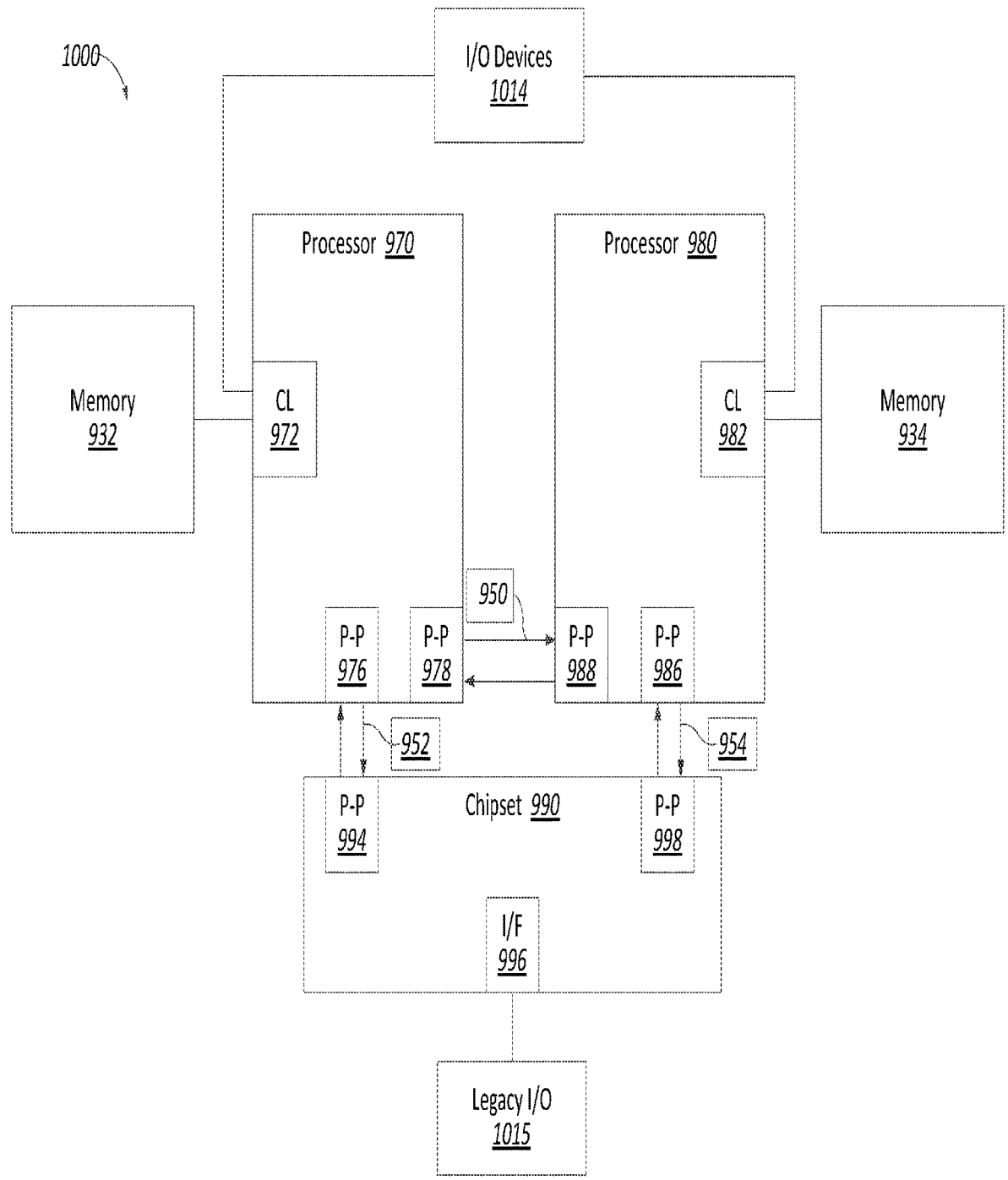
FIG. 10 is a block diagram of a computer system according to another implementation.

Referring now to FIG. 10, shown is a block diagram of a third system 1000 in accordance with an implementation of the disclosure. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processing devices 970, 980 may include integrated memory and I/O control logic ("CL") 972 and 982, respectively. For at least one implementation, the CL 972, 982 may include integrated memory controller units such as described herein. In addition. CL 972, 982 may also include I/O control logic. FIG. 10 illustrates that the memories 932, 934 are coupled to the CL 972, 982, and that I/O devices 1014 are also coupled to the control logic 972, 982. Legacy I/O devices 1015 are coupled to the chipset 990. The implementations of performing secure encryption key management in trust domains can be implemented in the processing device 970, processing device 980, or both.

Figure 11:
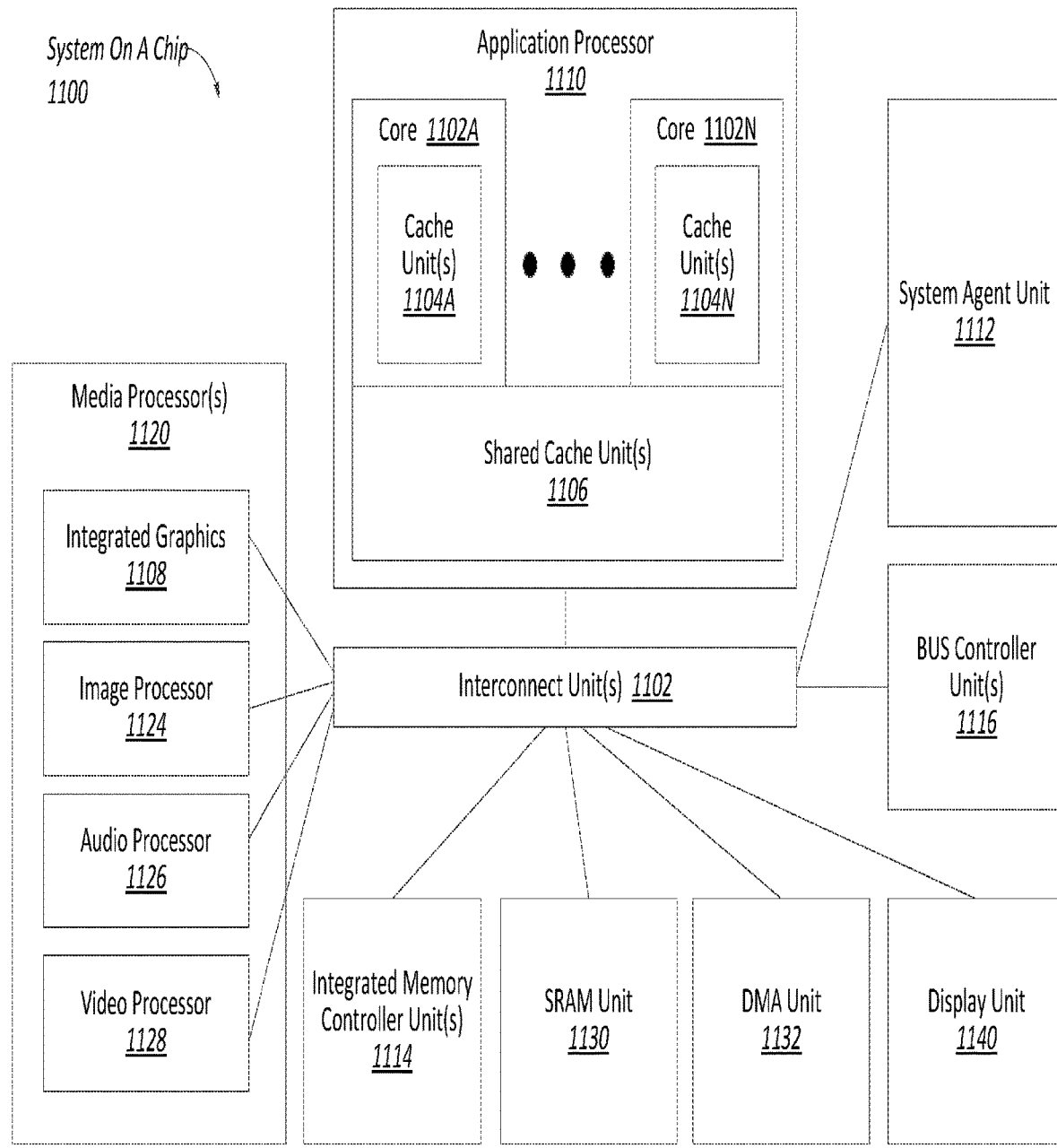
FIG. 11 is a block diagram of a system-on-a-chip according to one implementation.

FIG. 11 is an example system on a chip (SoC) that may include one or more of the cores 1102. Other system designs and configurations known in the arts for laptops, desktops, handheld PCs, personal digital assistants, engineering workstations, servers, network devices, network hubs, switches, embedded processing devices, digital signal processing devices (DSPs), graphics devices, video game devices, set-top boxes, micro controllers, cell phones, portable media players, hand held devices, and various other electronic devices, are also suitable. In general, a huge variety of systems or electronic devices capable of incorporating a processing device and/or other execution logic as disclosed herein are generally suitable.

Referring now to FIG. 11, shown is a block diagram of a SoC 1100 in accordance with an implementation of the disclosure. Also, dashed lined boxes are features on more advanced SoCs. In FIG. 11, an interconnect unit(s) 1102 is coupled to: an application processing device 1110 which includes a set of one or more cores 1102A-N and shared cache unit(s) 1106; a system agent unit 1112; a bus controller unit(s) 1116; an integrated memory controller unit(s) 1114; a set or one or more media processing devices 1120 which may include integrated graphics logic 1108, an image processing device 1124 for providing still and/or video camera functionality, an audio processing device 1126 for providing hardware audio acceleration, and a video processing device 1128 for providing video encode/decode acceleration; a static random access memory (SRAM) unit 1130; a direct memory access (DMA) unit 1132; and a display unit 1140 for coupling to one or more external displays. The implementations of performing secure encryption key management in trust domains can be implemented in SoC 1100.

Figure 12:
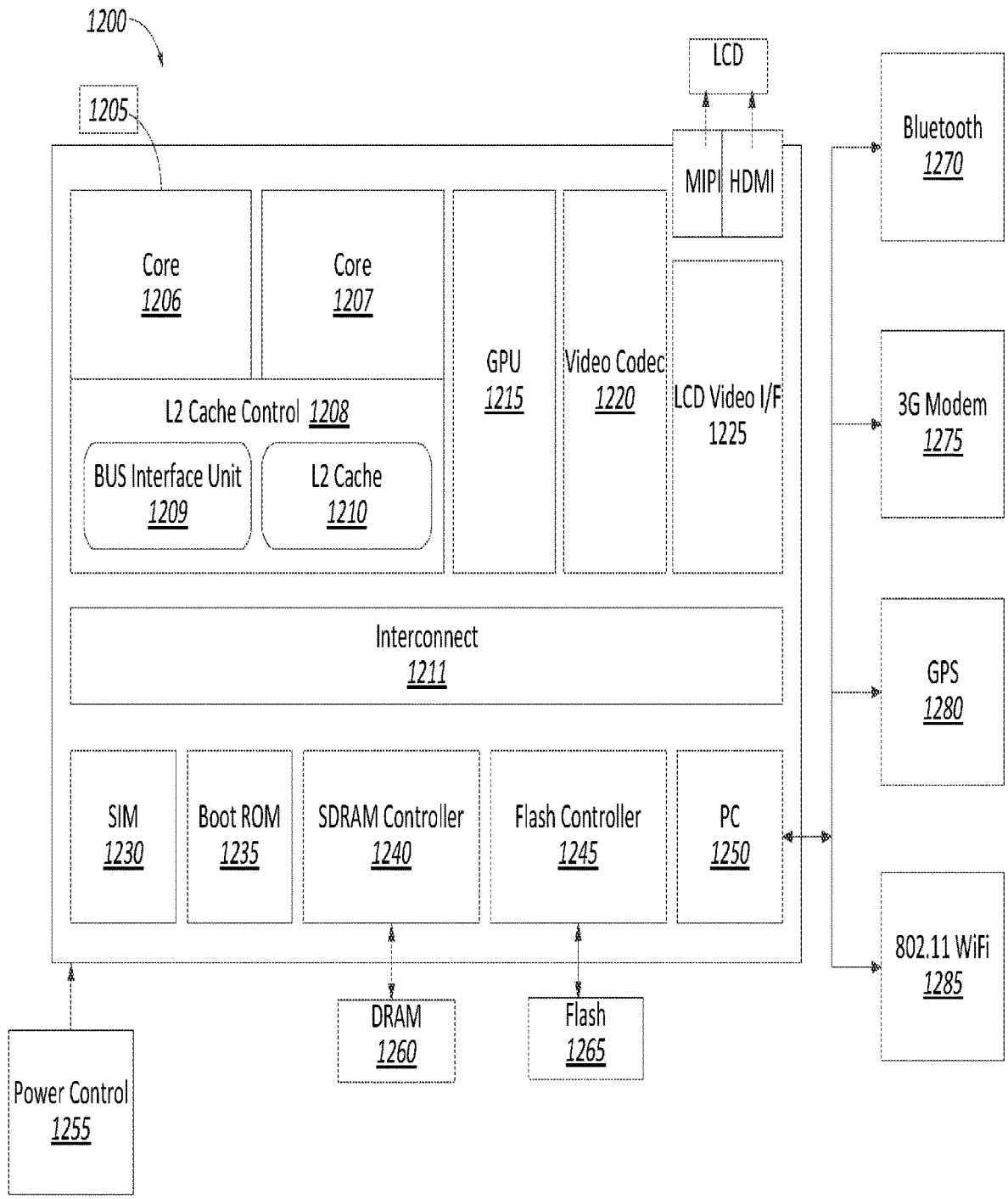
FIG. 12 illustrates another implementation of a block diagram for a computing system.

Turning next to FIG. 12, an implementation of an SoC design in accordance with implementations of the disclosure is depicted. As an illustrative example, SoC 1200 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the performing secure encryption key management in trust domains can be implemented in SoC 1200.

Here, SoC 1220 includes 2 cores—1206 and 1207. Similar to the discussion above, cores 1206 and 1207 may conform to an Instruction Set Architecture, such as a processing device having the Intel® Architecture Core™, an Advanced Micro Devices, Inc. (AMD) processing device, a MIPS-based processing device, an ARM-based processing device design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1211 includes an on-chip interconnect, such as an IOSF, AMBA, or other interconnects discussed above, which can implement one or more aspects of the described disclosure.

Interconnect 1211 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the implementations described herein.

In addition, the system illustrates peripherals for communication, such as a Bluetooth module 1270, 3G modem 1275, GPS 1280, and Wi-Fi 1285. Note as stated above, a UE includes a radio for communication. As a result, these peripheral communication modules may not all be included. However, in a UE some form of a radio for external communication should be included.

Figure 13:
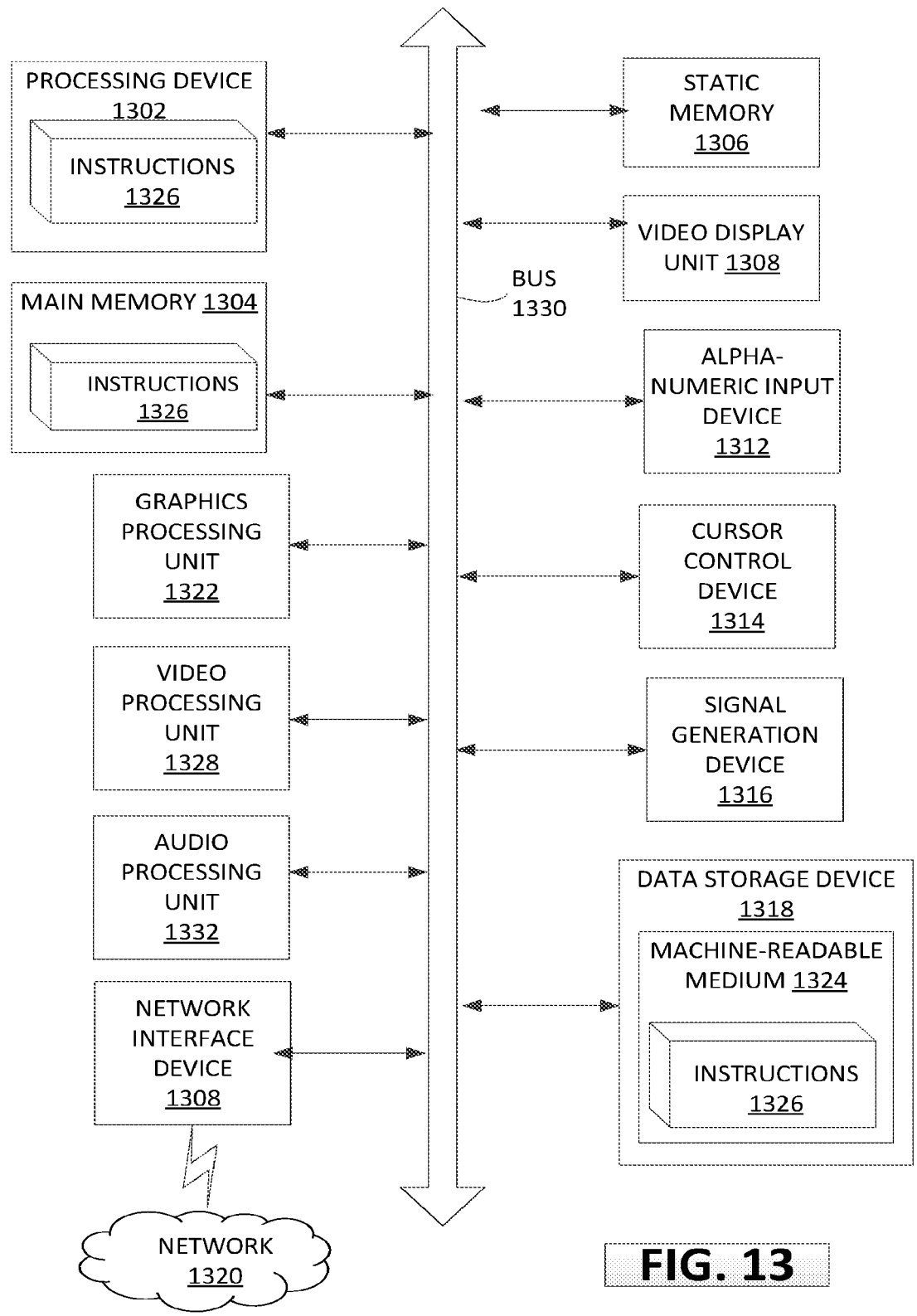
FIG. 13 illustrates another implementation of a block diagram for a computing system.

FIG. 13 illustrates a diagrammatic representation of a machine in the example form of a computing system 1300 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of performing secure encryption key management in trust domains can be implemented in computing system 1300.

The computing system 1300 includes a processing device 1302, main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessing device, central processing unit, or the like. More particularly, the processing device may be complex instruction set computing (CISC) microprocessing device, reduced instruction set computer (RISC) microprocessing device, very long instruction word (VLIW) microprocessing device, or processing device implementing other instruction sets, or processing devices implementing a combination of instruction sets. Processing device 1302 may also be one or more special-purpose processing devices such as an application specific integrated circuit (ASIC), a field programmable gate array (FPGA), a digital signal processing device (DSP), network processing device, or the like. In one implementation, processing device 1302 may include one or processing device cores. The processing device 1302 is configured to execute the processing logic 1326 for performing the operations discussed herein. In one implementation, processing device 1302 can be part of the computing system 100 of FIG. 1. Alternatively, the computing system 1300 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1300 may further include a network interface device 1308 communicably coupled to a network 1320. The computing system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a signal generation device 1316 (e.g., a speaker), or other peripheral devices. Furthermore, computing system 1300 may include a graphics processing unit 1322, a video processing unit 1328 and an audio processing unit 1332. In another implementation, the computing system 1300 may include a chipset (not illustrated), which refers to a group of integrated circuits, or chips, that are designed to work with the processing device 1302 and controls communications between the processing device 1302 and external devices. For example, the chipset may be a set of chips on a motherboard that links the processing device 1302 to very high-speed devices, such as main memory 1304 and graphic controllers, as well as linking the processing device 1302 to lower-speed peripheral buses of peripherals, such as USB, PCI or ISA buses.

The data storage device 1318 may include a computer-readable storage medium 1324 on which is stored software 1326 embodying any one or more of the methodologies of functions described herein. The software 1326 may also reside, completely or at least partially, within the main memory 1304 as instructions 1326 and/or within the processing device 1302 as processing logic 1326 during execution thereof by the computing system 1300; the main memory 1304 and the processing device 1302 also constituting computer-readable storage media.

The computer-readable storage medium 1324 may also be used to store instructions 1326 utilizing the processing device 1302, such as described with respect to FIG. 1, and/or a software library containing methods that call the above applications. While the computer-readable storage medium 1324 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the implementations. The term "computer-readable storage medium" shall accordingly be taken to include, but not be limited to, solid-state memories, and optical and magnetic media.

The following examples pertain to further implementations.

Example 1 is a processing device comprising: a key ownership table (KOT) that is protected against software access; and a processing core that is to execute a trust domain resource manager (TDRM), wherein the TDRM is to: create a trust domain (TD) and a randomly-generated encryption key corresponding to the TD, the randomly-generated encryption key identified by a guest key identifier (GKID) and protected against software access from at least one of the TDRM, a virtual machine manager (VMM), or other TDs; reference the KOT to obtain at least one unassigned host key identifier (HKID) corresponding to the randomly-generated encryption key, the HKID utilized to encrypt a TD memory; assign the HKID to the TD by marking the HKID in the KOT as assigned; and configure the randomly-generated encryption key on the processing device by associating the randomly-generated encryption key with the HKID, wherein the assigned HKID and the configured randomly-generated encryption key allow the TD memory to be accessible by the TD.

Example 2 is a processing device of example 1, wherein responsive to determining that a number of unassigned HKIDs in the KOT are below a threshold, the TDRM is to: reclaim the HKID from the TD by marking the HKID in the KOT as reclaimed; responsive to reclaiming the HKID, clear a memory cache on the processing device to delete data encrypted with the HKID from the memory cache; and mark the HKID as unassigned in the KOT.

Example 3 is a processing device of example 2, wherein the TDRM to reclaim the HKID from the TD further comprises the TDRM to decouple the HKID from the TD.

Example 4 is a processing device of example 2, wherein responsive to reclaiming the HKID from the TD, the TDRM is to revive the TD by: assigning an unassigned HKID from the KOT to the TD; and configuring the randomly-generated encryption key on the processing device by associating the randomly-generated encryption key with the assigned HKID, wherein the assigned HKID and the configured randomly-generated encryption key allow the TD memory to be accessible by the TD.

Example 5 is a processing device of example 1, wherein responsive to marking the HKID in the KOT as assigned, the TDRM is to remove the HKID from the list of HKIDs assignable by the TDRM to other TDs.

Example 6 is a processing device of example 1, wherein the randomly-generated encryption key comprises an ephemeral random encryption key generated by the TD to be used exclusively by the TD.

Example 7 is a processing device of example 1, wherein configuring the randomly-generated encryption key on the processing device further comprises encrypting the TD memory by an encryption engine using the randomly-generated encryption key.

Example 8 is a processing device of example 1, wherein the unassigned HKID comprises a host key ID designated for TD private memory encryption keys.

Example 9 is a processing device of example 1, wherein the assigned HKID is stored in an access-controlled TD control structure (TDCS).

Example 10 is a method comprising: creating, by a trust domain resource manager (TDRM) executing on a processing device to manage a trust domain (TD), a TD and a randomly-generated encryption key corresponding to the TD, the randomly-generated encryption key identified by a guest key identifier (GKID) and protected against software access from at least one of the TDRM, a virtual machine manager (VMM), or other TDs; referencing, by the TDRM, a key ownership table (KOT) that is protected against software access to obtain at least one unassigned host key identifier (HKID) corresponding to the randomly-generated encryption key, the HKID utilized to encrypt a TD memory, wherein the KOT is stored on the processing device; assigning the HKID to the TD by marking the HKID in the KOT as assigned; and configuring the randomly-generated encryption key on the processing device by associating the randomly-generated encryption key with the HKID, wherein the assigned HKID and the configured randomly-generated encryption key allow the TD memory to be accessible by the TD.

Example 11 is a method of example 10, wherein responsive to determining that a number of unassigned HKIDs in the KOT are below a threshold, further comprising: reclaiming, by the TDRM, the HKID from the TD by marking the HKID in the KOT as reclaimed; responsive to reclaiming the HKID, clearing a memory cache on the processing device to delete data encrypted with the HKID from the memory cache; and marking the HKID as unassigned in the KOT.

Example 12 is a method of example 11, wherein reclaiming the HKID from the TD further comprises decoupling the HKID from the TD.

Example 13 is a method of example 11, wherein responsive to reclaiming the HKID from the TD, further comprising: reviving, by the TDRM, the TD by: assigning an unassigned HKID from the KOT to the TD; and configuring the randomly-generated encryption key on the processing device by associating the randomly-generated encryption key with the assigned HKID, wherein the assigned HKID and the configured randomly-generated encryption key allow the TD memory to be accessible by the TD.

Example 14 is a method of example 10, wherein responsive to marking the HKID in the KOT as assigned, further comprising: removing, by the TDRM, the HKID from the list of HKIDs assignable by the TDRM to other TDs.

Example 15 is a method of example 10, wherein the randomly-generated encryption key comprises an ephemeral random encryption key generated by the TD to be used exclusively by the TD.

Example 16 is a method of example 10, wherein configuring the randomly-generated encryption key on the processing device further comprises encrypting the TD memory by an encryption engine using the randomly-generated encryption key.

Example 17 is a method of example 10, wherein the unassigned HKID comprises a host key ID designated for TD private memory encryption keys.

Example 18 is a method of example 10, wherein the assigned HKID is stored in an access-controlled TD control structure (TDCS).

Example 19 is a system comprising: a memory device to store instructions; and a processing device operably coupled to the memory device, the processing device comprising: a key ownership table (KOT) that is protected against software access; and a processing core that is to execute a trust domain resource manager (TDRM), wherein the TDRM is to: create a trust domain (TD) and a randomly-generated encryption key corresponding to the TD, the randomly-generated encryption key identified by a guest key identifier (GKID) and protected against software access from at least one of the TDRM, a virtual machine manager (VMM), or other TDs; reference the KOT to obtain at least one unassigned host key identifier (HKID) corresponding to the randomly-generated encryption key, the HKID utilized to encrypt a TD memory; assign the HKID to the TD by marking the HKID in the KOT as assigned; and configure the randomly-generated encryption key on the processing device by associating the randomly-generated encryption key with the HKID, wherein the assigned HKID and the configured randomly-generated encryption key allow the TD memory to be accessible by the TD.

Example 20 is a system of example 19, wherein responsive to reclaiming the HKID from the TD, the TDRM is to revive the TD by: assigning an unassigned HKID from the KOT to the TD; and configuring the randomly-generated encryption key on the processing device by associating the randomly-generated encryption key with the assigned HKID, wherein the assigned HKID and the configured randomly-generated encryption key allow the TD memory to be accessible by the TD.

Example 21 is a non-transitory computer readable medium storing instructions, which when executed by a processor, cause the processor to perform a plurality of operations comprising: creating, by a trust domain resource manager (TDRM) executing on a processing device to manage a trust domain (TD), a TD and a randomly-generated encryption key corresponding to the TD, the randomly-generated encryption key identified by a guest key identifier (GKID) and protected against software access from at least one of the TDRM, a virtual machine manager (VMM), or other TDs; referencing, by the TDRM, a key ownership table (KOT) that is protected against software access to obtain at least one unassigned host key identifier (HKID) corresponding to the randomly-generated encryption key, the HKID utilized to encrypt a TD memory, wherein the KOT is stored on the processing device; assigning the HKID to the TD by marking the HKID in the KOT as assigned; and configuring the randomly-generated encryption key on the processing device by associating the randomly-generated encryption key with the HKID, wherein the assigned HKID and the configured randomly-generated encryption key allow the TD memory to be accessible by the TD.

Example 22 is a non-transitory computer readable medium of example 21, wherein responsive to determining that a number of unassigned HKIDs in the KOT are below a threshold, further comprising: reclaiming, by the TDRM, the HKID from the TD by marking the HKID in the KOT as reclaimed; responsive to reclaiming the HKID, clearing a memory cache on the processing device to delete data encrypted with the HKID from the memory cache; and marking the HKID as unassigned in the KOT.

Example 23 is a non-transitory computer readable medium of example 21, wherein reclaiming the HKID from the TD further comprises decoupling the HKID from the TD.

Example 24 is a non-transitory computer readable medium of example 21, wherein responsive to reclaiming the HKID from the TD, further comprising: reviving, by the TDRM, the TD by: assigning an unassigned HKID from the KOT to the TD; and configuring the randomly-generated encryption key on the processing device by associating the randomly-generated encryption key with the assigned HKID, wherein the assigned HKID and the configured randomly-generated encryption key allow the TD memory to be accessible by the TD.

Example 25 is a non-transitory computer readable medium of example 21, wherein responsive to marking the HKID in the KOT as assigned, further comprising: removing, by the TDRM, the HKID from the list of HKIDs assignable by the TDRM to other TDs.

Example 26 is a non-transitory computer readable medium of example 21, wherein the randomly-generated encryption key comprises an ephemeral random encryption key generated by the TD to be used exclusively by the TD.

Example 27 is a non-transitory computer readable medium of example 21, wherein configuring the randomly-generated encryption key on the processing device further comprises encrypting the TD memory by an encryption engine using the randomly-generated encryption key.

Example 28 is a non-transitory computer readable medium of example 21, wherein the unassigned HKID comprises a host key ID designated for TD private memory encryption keys.

Example 29 is a non-transitory computer readable medium of example 21, wherein the assigned HKID is stored in an access-controlled TD control structure (TDCS).

Example 30 is a system comprising: means to create a trust domain (TD) and a randomly-generated encryption key corresponding to the TD, the randomly-generated encryption key identified by a guest key identifier (GKID) and protected against software access from at least one of the TDRM, a virtual machine manager (VMM), or other TDs; reference the KOT to obtain at least one unassigned host key identifier (HKID) corresponding to the randomly-generated encryption key, the HKID utilized to encrypt a TD memory; means to assign the HKID to the TD by marking the HKID in the KOT as assigned; and means to configure the randomly-generated encryption key on the processing device by associating the randomly-generated encryption key with the HKID, wherein the assigned HKID and the configured randomly-generated encryption key allow the TD memory to be accessible by the TD.

Example 31 is a system of example 30, wherein responsive to determining that a number of unassigned HKIDs in the KOT are below a threshold, the TDRM comprises means to reclaim the HKID from the TD by marking the HKID in the KOT as reclaimed; responsive to reclaiming the HKID, the TDRM comprises means to clear a memory cache on the processing device to delete data encrypted with the HKID from the memory cache; and means to mark the HKID as unassigned in the KOT.

Example 32 is a system of example 30, wherein the means to reclaim the HKID from the TD further comprises means to decouple the HKID from the TD.

Example 33 is a system of example 30, wherein responsive to reclaiming the HKID from the TD, the TDRM comprises means to revive the TD by comprising: means to assign an unassigned HKID from the KOT to the TD; and means to configure the randomly-generated encryption key on the processing device by associating the randomly-generated encryption key with the assigned HKID, wherein the assigned HKID and the configured randomly-generated encryption key allow the TD memory to be accessible by the TD.

Example 34 is a system of example 30, wherein responsive to marking the HKID in the KOT as assigned, the TDRM comprises means to remove the HKID from the list of HKIDs assignable by the TDRM to other TDs.

Example 35 is a system of example 30, wherein the randomly-generated encryption key comprises an ephemeral random encryption key generated by the TD to be used exclusively by the TD.

Example 36 is a system of example 30, wherein the means to configure the randomly-generated encryption key on the system further comprises means to encrypt the TD memory by an encryption engine using the randomly-generated encryption key.

Example 37 is a system of example 30, wherein the unassigned HKID comprises a host key ID designated for TD private memory encryption keys.

Example 38 is a system of example 30, wherein the assigned HKID is stored in an access-controlled TD control structure (TDCS).

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the disclosure. It will be apparent, however, to one skilled in the art that these specific details need not be employed to practice the disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the disclosure.

The implementations are described with reference to determining validity of data in cache lines of a sector-based cache in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processor, other implementations are applicable to other types of integrated circuits and logic devices. Similar techniques and teachings of implementations of the disclosure can be applied to other types of circuits or semiconductor devices that can benefit from higher pipeline throughput and improved performance. The teachings of implementations of the disclosure are applicable to any processor or machine that performs data manipulations. However, the disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the above examples describe instruction handling and distribution in the context of execution units and logic circuits, other implementations of the disclosure can be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions can be used to cause a general-purpose or special-purpose processor that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one implementation, refers to some apparatus, logic, hardware, and/or element designed in such a way to enable use of the apparatus, logic, hardware, and/or element in a specified manner. Note as above that use of 'to,' 'capable to,' or 'operable to,' in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processing device comprising:
   memory to store a key ownership data structure table (KODS) that is to be protected by a trust domain module against direct software access; and
   a processor core configurable to implement a trust domain module to maintain the KODS, wherein the KODS is to be used to manage host key identifiers (HKIDs) to at least assign HKIDs to a trust domain (TD) and revoke HKIDs from a TD, wherein the processor core is further configurable to execute a virtual machine monitor (VMM), wherein the trust domain module is configurable to respond to the VMM to:
      execute a function to create a TD and an encryption key corresponding to the TD, the encryption key to be identified by a guest key identifier (GKID) and protected against software access from at least other TDs;
      reference the KODS to obtain at least one unassigned HKID corresponding to the encryption key, the HKID utilized to encrypt a TD memory and assign the HKID to the TD by marking the HKID in the KODS as assigned; and
      configure the encryption key on the processing device by associating the encryption key with the HKID, wherein the assigned HKID and the configured encryption key allow the TD memory to be accessible by the TD, wherein responsive to determining that a number of unassigned HKIDs in the KODS are below a threshold, the trust domain module is to:
         reclaim the HKID from the TD by marking the HKID in the KODS;
         responsive to reclaiming the HKID, clear a memory cache on the processing device to delete data encrypted with the HKID from the memory cache; and
         mark the HKID as unassigned in the KODS.

2. The processing device of claim 1, wherein the trust domain module to reclaim the HKID from the TD further comprises the trust domain module to decouple the HKID from the TD.

3. The processing device of claim 1, wherein responsive to reclaiming the HKID from the TD, the trust domain module is to revive the TD by:
   assigning an unassigned HKID from the KODS to the TD; and
   configuring the encryption key on the processing device by associating the encryption key with the assigned HKID, wherein the assigned HKID and the configured encryption key allow the TD memory to be accessible by the TD.

4. The processing device of claim 1, wherein responsive to marking the HKID in the KODS as assigned, the trust domain module is to remove the HKID from a list of HKIDs assignable by the trust domain module to other TDs.

5. The processing device of claim 1, wherein the encryption key comprises an ephemeral random encryption key generated by the TD to be used exclusively by the TD.

6. The processing device of claim 1, wherein configuring the encryption key on the processing device further comprises to encrypt the TD memory by an encryption engine using the encryption key.

7. The processing device of claim 1, wherein the unassigned HKID comprises a host key ID designated for TD private memory encryption keys.

8. The processing device of claim 1, wherein the assigned HKID is to be stored in an access-controlled TD control structure (TDCS).

9. A method comprising:
   creating, by a trust domain module executing on a processing device to manage a trust domain (TD), a TD and a randomly-generated encryption key corresponding to the TD, the randomly-generated encryption key identified by a guest key identifier (GKID) and protected against software access from at least other TDs;
   referencing, by a trust domain resource manager (TDRM), a key ownership data structure (KODS) that is protected against software access to obtain at least one unassigned host key identifier (HKID) corresponding to the randomly-generated encryption key, the HKID utilized to encrypt a TD memory, wherein the KODS is stored on the processing device;
   KODS assigning the HKID to the TD by marking the HKID in the KODS as assigned; and
   configuring the randomly-generated encryption key on the processing device by associating the randomly-generated encryption key with the HKID, wherein the assigned HKID and the configured randomly-generated encryption key allow the TD memory to be accessible by the TD.

10. The method of claim 9, wherein responsive to determining that a number of unassigned HKIDs in the KODS are below a threshold, further comprising:
    reclaiming, by the trust domain module, the HKID from the TD by marking the HKID in the KODS as reclaimed;
    responsive to reclaiming the HKID, clearing a memory cache on the processing device to delete data encrypted with the HKID from the memory cache; and
    marking the HKID as unassigned in the KODS.

11. The method of claim 10, wherein reclaiming the HKID from the TD further comprises decoupling the HKID from the TD.

12. The method of claim 10, wherein responsive to reclaiming the HKID from the TD, further comprising:
    reviving, by the trust domain module, the TD by:
       assigning an unassigned HKID from the KODS to the TD; and
       configuring the randomly-generated encryption key on the processing device by associating the randomly-generated encryption key with the assigned HKID, wherein the assigned HKID and the configured randomly-generated encryption key allow the TD memory to be accessible by the TD.

13. The method of claim 9, wherein responsive to marking the HKID in the KODS as assigned, further comprising:

removing, by the trust domain module, the HKID from a list of HKIDs assignable by the TDRM to other TDs.

14. The method of claim 9, wherein the randomly-generated encryption key comprises an ephemeral random encryption key generated by the TD to be used exclusively by the TD.

15. The method of claim 9, wherein configuring the randomly-generated encryption key on the processing device further comprises encrypting the TD memory by an encryption engine using the randomly-generated encryption key.

16. The method of claim 9, wherein the unassigned HKID comprises a host key ID designated for TD private memory encryption keys.

17. The method of claim 9, wherein the assigned HKID is stored in an access-controlled TD control structure (TDCS).

18. A system comprising:

a memory device to store instructions; and a processing device operably coupled to the memory device, the processing device comprising:

a key ownership data structure (KODS) that is protected against software access; and a processing core that is configurable to execute a trust domain module wherein the trust domain module is to, responsive to a virtual machine monitor (VMM):

create a trust domain (TD) and a randomly-generated encryption key corresponding to the TD, the randomly-generated encryption key identified by a guest key identifier (GKID) and protected against software access from at least other TDs;

reference the KODS to obtain at least one unassigned host key identifier (HKID) corresponding to the randomly-generated encryption key, the HKID utilized to encrypt a TD memory;

assign the HKID to the TD by marking the HKID in the KODS as assigned; and configure the randomly-generated encryption key on the processing device by associating the randomly-generated encryption key with the HKID, wherein the assigned HKID and the configured randomly-generated encryption key allow the TD memory to be accessible by the TD.

19. The system of claim 18, wherein responsive to reclaiming the HKID from the TD, the trust domain module is to revive the TD by:

assigning an unassigned HKID from the KODS to the TD; and configuring the randomly-generated encryption key on the processing device by associating the randomly-generated encryption key with the assigned HKID, wherein the assigned HKID and the configured randomly-generated encryption key allow the TD memory to be accessible by the TD.

* * * * *